(12) United States Patent
Terahara

(10) Patent No.: US 6,307,656 B2
(45) Date of Patent: Oct. 23, 2001

(54) BI-DIRECTIONAL WAVELENGTH SWITCHING DEVICE AND WAVELENGTH DEMULTIPLEXING/MULTIPLEXING DEVICE

(75) Inventor: Takafumi Terahara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/778,774

(22) Filed: Feb. 8, 2001

Related U.S. Application Data

(62) Division of application No. 09/087,635, filed on May 29, 1998, now Pat. No. 6,211,980.

(30) Foreign Application Priority Data

Jan. 30, 1998 (JP) .................................................. 10-020033

(51) Int. Cl.⁷ .................................................. H04J 14/02
(52) U.S. Cl. .................... 359/124; 359/128; 359/152; 385/24
(58) Field of Search ............... 359/124, 127–128, 359/152; 385/7, 16, 24

(56) References Cited

U.S. PATENT DOCUMENTS

| | | | |
|---|---|---|---|
| Re. 37,044 | * 2/2001 | Wu | ........................ 349/117 |
| 5,173,794 | * 12/1992 | Cheung et al. | ........................ 359/127 |
| 5,276,543 | 1/1994 | Olshansky | ........................ 359/124 |
| 5,488,500 | 1/1996 | Glance . | |
| 5,572,612 | 11/1996 | Delavaux et al. . | |
| 5,606,439 | 2/1997 | Wu | ........................ 385/14 |
| 5,751,868 | 5/1998 | Bala et al. | ........................ 385/16 |
| 5,946,430 | * 8/1999 | Morrow et al. | ........................ 385/24 |
| 6,020,986 | 2/2000 | Ball | ........................ 359/130 |
| 6,052,497 | * 4/2000 | Graebner | ........................ 385/7 |
| 6,061,157 | 5/2000 | Terahara | ........................ 359/124 |
| 6,061,484 | 5/2000 | Jones et al. | ........................ 385/24 |
| 6,108,468 | 8/2000 | Kaneko et al. | ........................ 385/24 |

FOREIGN PATENT DOCUMENTS

| | | |
|---|---|---|
| 62-36643A | 2/1987 | (JP) . |
| 1-136494A | 5/1989 | (JP) . |
| 2-40631A | 2/1990 | (JP) . |
| 5-347601 | 12/1993 | (JP) . |
| 8-331047.A | 12/1996 | (JP) . |

* cited by examiner

Primary Examiner—Kinfe-Michael Negash
(74) Attorney, Agent, or Firm—Staas & Halsey LLP

(57) ABSTRACT

An optical device has an optical switching unit and a variable filter, the optical switching unit connects a pair of single direction optical transmission lines to a bi-directional optical transmission line carrying optical signals of different wavelengths in different directions relative to the optical switching unit. The single direction optical transmission lines carry optical signals in single different directions relative to the optical switching unit. The variable filter has first and second opposing terminal pairs such that optical signals of different wavelengths input to one terminal of one terminal pair are filtered with a portion of the different wavelengths being output to one terminal of the opposing terminal pair and the remainder of the different wavelengths being output to the other terminal of the opposing terminal pair. The bi-directional optical transmission line is coupled to one terminal of the variable filter. The optical switching unit may include an optical circulator. The variable filter may be an acousto-optic tunable filter. The optical device have a pair of optical switching units respectively connecting two pairs of single direction optical transmission lines to two opposing terminals of the variable filter through two bi-directional optical transmission lines.

6 Claims, 24 Drawing Sheets

FIG. 11

WAVELENGTH BAND

| $\lambda$ | $\lambda'$ |
|---|---|
| $\lambda-1$ | $\lambda'-2$ |
| $\lambda-2$ | $\lambda'-1$ |
| $\lambda-4$ | $\lambda'-3$ |
|  |  |

→ WAVELENGTH

DEMULTIPLEXING/
MULTIPLEXING CHARACTERISTIC

FIG. 13

WAVELENGTH BAND

| $\lambda$ | $\lambda'$ |
|---|---|
| $\lambda-1$ | $\lambda'-2$ |
| $\lambda-2$ | $\lambda'-1$ |
| $\lambda-4$ | $\lambda'-3$ |
| | |

→ WAVELENGTH

DEMULTIPLEXING / MULTIPLEXING CHARACTERISTIC

BI-DIRECTIONAL WAVELENGTH SWITCHING DEVICE AND WAVELENGTH DEMULTIPLEXING/MULTIPLEXING DEVICE

This a application is a divisional of application Ser. No. 09/087,635, filed May 29, 1998, now allowed U.S. Pat No. 6,211,980.

CROSS-REFERENCE TO RELATED APPLICATIONS

This application claims priority to Japanese patent application number 10-020033, filed Jan. 30, 1998 in Japan, which is incorporated herein by reference.

BACKGROUND OF THE INVENTION

1. Field of the Invention

The present invention relates to a bi-directional wavelength switching device and a wavelength demultiplexing/multiplexing device suitable for use in the wavelength division multiplexed transmission system.

2. Description of the Related Art

Accompanied with the recent advanced developments and intricacies in communication technology, wavelength division multiplexed ("WDM") transmission has been proposed as a way to transmit large amounts of information on optical fibers. FIG. 20 is a block diagram generally illustrating a proposed wavelength division multiplexed transmission system. The WDM transmission system 100' shown in FIG. 20 employs wavelength demultiplexing/multiplexing devices 1'-a and 1'-b to be integrated into a WDM network.

The transmission line usually employs more than one pair of optical fibers 7'. One pair will be considered. The other pairs may provide for additional information transmission or provide for backups. One of the optical fibers 8'-a in the pair is used for the upstream communication line, and another optical fiber 8'-b is used for the downstream communication line. Optical amplifier repeaters 9'-a are placed in order to compensate for losses in the optical fibers 8'-a and 8'-b on the upstream and downstream communication lines. One optical amplifier repeater 9'-a is provided with at least two optical amplifiers 9'-b (more than two amplifiers for more fibers) for the upstream and downstream communication lines. From each of the terminal stations 50a', 50b', 50c', and 60', a plurality of optical signals (WDM signals) respectively having different wavelengths are transmitted into one optical fiber. The WDM signals are split into the various transmission lines according to wavelength by the wavelength demultiplexing/multiplexing devices 1'-a and 1'-b to thereby be transmitted to the terminal stations 50a', 50b', 50c', and 60'.

The wavelength demultiplexing/multiplexing devices 1'-a, 1'-b used for the WDM network each include a combination of OADM (optical add-drop multiplexer) circuits.

FIG. 21 is a chart to explain the basic character of an OADM circuit. The OADM circuit 30'a drops only the optical signals having selected wavelengths from the WDM signals having a plurality of wavelengths (λ1, λ2, . . . , λn) propagating in a trunk system transmission fiber 8'-c. These optical signals are dropped to a drop transmission fiber 8'-e. The OADM circuit 30a' adds optical signals input from an add transmission fiber 8'-d to the optical signals travelling on trunk system fiber 8'-c. The added optical signals and the signals not dropped are output onto a trunk system transmission fiber 8'-f. Usually, the same wavelength is selected for the wavelength of the optical signal to be dropped and the wavelength of the optical signal to be added.

In the WDM optical communication system, normally one or more optical fiber pairs are used for the upstream and downstream transmission lines. Accordingly, the wavelength demultiplexing/multiplexing devices 1'-a and 1'-b are comprised of more than two of the OADM circuits shown in FIG. 21. The wavelength demultiplexing/multiplexing device 1'-a (1'-b) is constructed such that an OADM circuit 30'a intervenes in each trunk system optical fiber 8'-a and 8'-b, , with each OADM circuit connected to a separate drop and add optical fibers 8-g and 8-h, as shown in FIG. 22.

Further, to give the OADM circuit the capability of selecting the wavelength to be dropped or added, it is conceivable to use an acoustic-optic tunable filter (hereunder, referred to as "AOTF") capable of varying the permeability for the OADM circuit. The AOTF is a device in which an acousto-optical effect is applied, which can be used effectively as an optical filter that can vary the filtered wavelength. The construction of the AOTF has been proposed in several types, however, the basic operational principle is the same.

FIG. 23 shows an example of an AOTF. The AOTF 30' employs a radio frequency ("RF") signal, which is input to an electrode 30'-1 (IDT, hereunder referred to as a transducer) through a control port 30-7 to thereby produce a surface acoustic wave ("SAW"). The SAW propagates in an SAW cladding 30'-2, and is absorbed by an SAW absorber 30'-3. On the other hand, the optical signals come in from an optical input port 01, and are polarized and split by a Polarization Beam Splitter ("PBS") 30'-4 into two optical waveguides. The SAW and the optical signals overlap and interfere, to polarize only the optical signals having a wavelength corresponding to the frequency of the SAW. This is due to the acousto-optical effect. The selectively polarized optical signals are split off by a PBS 30'-5 at the output. The polarized optical signals are output from the optical output port 02', and the non-polarized optical signals are output from an optical output port 01'. At the same time, other optical signals are introduced at optical input port 02. There is a one-to-one correspondence between the frequency of the RF signal frequency, namely the frequency of the SAW, and the wavelength of the optical signal to be polarized, under a constant temperature. In other words, it is possible to select the wavelength of an optical signal to be output by varying the RF signal frequency.

When the AOTF 30' is used as in an OADM, the optical input port 01 is usually used as the main input port, the optical input port 02 as the add light input port, the optical output port 01' as the main output port and the optical output port 02' as the drop light input port. When the RF signal is supplied to the transducer, it is possible to simultaneously add and drop optical signals having a wavelength corresponding to the frequency of the RF signal. Further, if a plurality of RF signals of different frequencies are supplied to the electrodes, it is possible to select optical signals having a plurality of wavelengths respectively corresponding to those RF signals. That is, the foregoing construction is very effective for use with an OADM filter that simultaneously adds and drops optical signals having a plurality of wavelengths. The AOTF is bi-directional in principle, and to replace the input port with the output and vice versa will maintain the same operation.

The AOTF 30' shown in FIG. 24 may be used in the wavelength demultiplexing/multiplexing device shown in FIG. 22. However, the construction shown in FIG. 22 requires two AOTFs, and moreover, requires two RF signal sources and two driving circuits to drive the two AOTFs. Accordingly, the device becomes complicated, and this is a problem.

SUMMARY OF THE INVENTION

Accordingly, it is an object of the present invention to switch optical signals to and from an optical fiber in a wavelength division multiplexed transmission system.

It is further object of the present invention to switch optical signals from a bi-directional transmission line.

It is another object of the present invention to optionally select wavelength of the switched signals.

It is a still further object of the present invention to reduce the number of devices required to switch signals from a bi-directional optical fiber.

These and other objects are accomplished by providing an optical device having an optical switching unit and a variable filter. The optical switching unit connects a pair of single direction optical transmission lines to a bi-directional optical transmission line carrying optical signals of different wavelengths in different directions relative to the optical switching unit. The single direction optical transmission lines carry optical signals in single different directions relative to the optical switching unit. The variable filter has first and second opposing terminal pairs such that optical signals of different wavelengths input to one terminal of one terminal pair are filtered with a portion of the different wavelengths being output to one terminal of the opposing terminal pair and the remainder of the different wavelengths being output to the other terminal of the opposing terminal pair. The bi-directional optical transmission line is coupled to one terminal of the variable filter.

Alternatively, an optical device may have an acousto-optic tunable filter having first and second sides, a bi-directional optical transmission line connected to one side of the acousto-optic tunable filter, and an optical switching unit. The optical switching unit connects the bi-directional optical transmission line and two single direction optical transmission lines such that an optical signal travelling from the acousto-optic tunable filter is output to one of the single direction optical transmission lines and an optical signal travelling to the acousto-optic tunable filter is input from the other of the single direction optical transmission lines.

Alternatively, a wavelength division multiplexed transmission system includes a multiplexing device and a pair of transmit/receive terminal stations. The transmit/receive terminal stations communicate to each other. The multiplexing device is provided within a communication line between the pair of optical transmit/receive terminal stations. The multiplexing device has an acousto-optic tunable filter having first and second sides, a pair of bi-directional optical transmission lines connected respectively to the first and second sides of the acousto-optic tunable filter, and a pair of optical switching units. Each of the optical switching units connect one of the bi-directional optical transmission lines to two single direction optical transmission lines such that for each optical switching unit, an optical signal travelling from the acousto-optic tunable filter is output to one of the single direction optical transmission lines and an optical signal travelling to the acousto-optic tunable filter is input from the other of the single direction optical transmission lines.

BRIEF DESCRIPTION OF THE DRAWINGS

The invention will now be described in more detail in connection with the attached drawings in which like reference characters represent like elements, wherein:

FIG. 11 is a chart illustrating a wavelength arrangement of the WDM transmission system shown in FIG. 10;

FIG. 13 is a chart illustrating a wavelength arrangement of the WDM transmission system shown in FIG. 12;

DETAILED DESCRIPTION OF THE PREFERRED EMBODIMENTS

The invention will now be described in detail with reference to the accompanying drawing and preferred embodiments given by way of example only, and not limitation.

(a) First Embodiment

Figure 1:
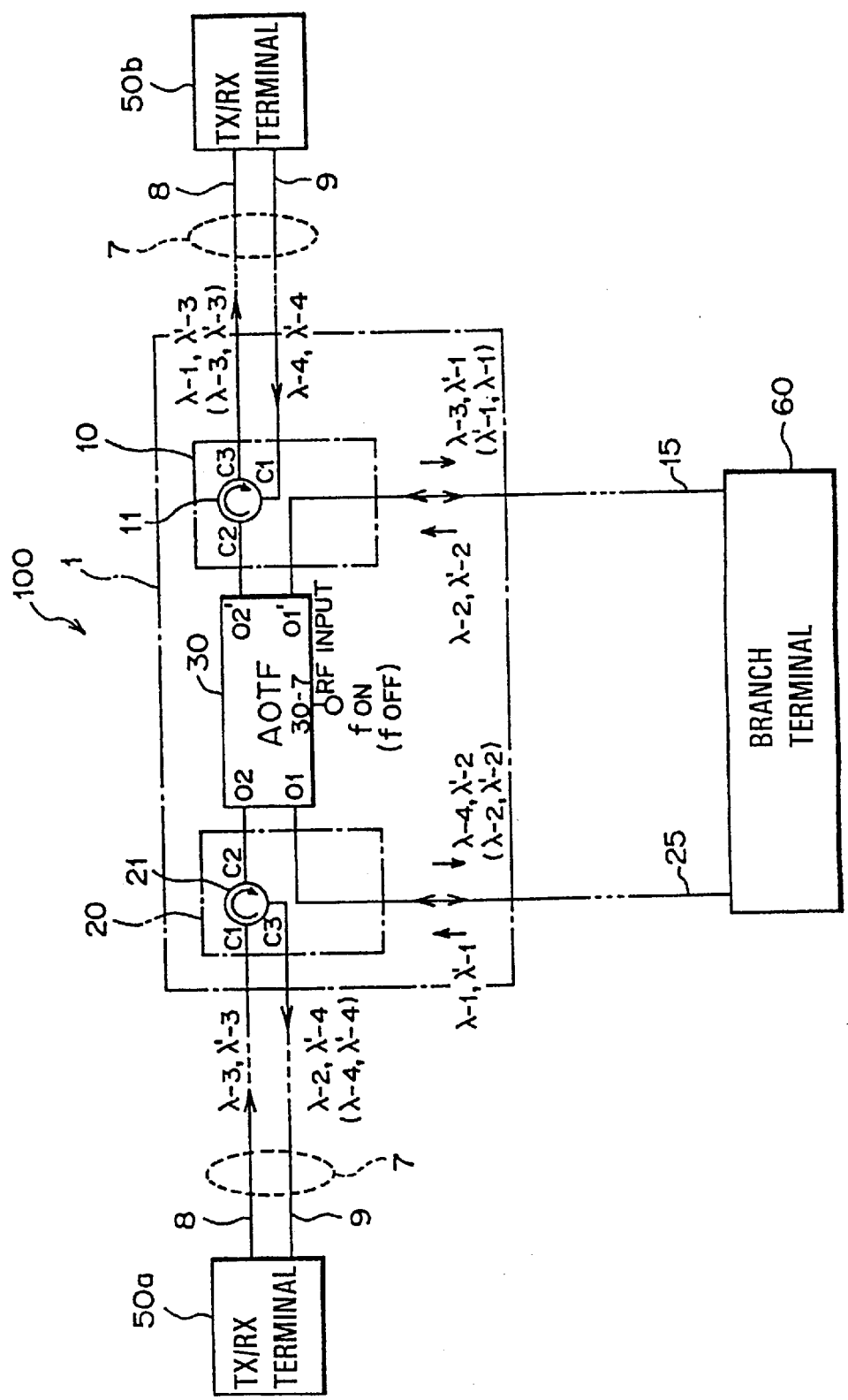
FIG. 1 is a block diagram illustrating a WDM transmission system employing a wavelength demultiplexing/multiplexing device related to a first embodiment of the invention.

FIG. 1 is a block diagram to illustrate a WDM transmission system in which a wavelength demultiplexing/multiplexing device 1 relating to the first embodiment of the invention is applied. A WDM transmission system 100 shown in FIG. 1 is constructed such that an optical fiber pair 7 (trunk system transmission line) as a bi-directional optical signal transmission means connects optical transmit/receive terminal stations 50a and 50b to transmit and receive wavelength division multiplexed signals. The wavelength demultiplexing/multiplexing device 1 is positioned between the optical transmit/receive terminal stations 50a and 50b.

The optical fiber pair 7 contains one optical fiber 8 serving as the upstream line and another optical fiber 9 serving as the downstream line.

The wavelength demultiplexing/multiplexing device 1 drops only selected wavelength optical signals from the WDM signals ($\lambda 1, \lambda 2, \ldots, \lambda n$) transmitted by the optical transmit/receive terminal station 50a, propagating through the trunk system transmission fiber 8 into a transmission fiber 15. Also, the wavelength demultiplexing/multiplexing device 1 adds optical signals input from a transmission fiber 25, to the rest of the optical signals. The device outputs the added optical signals to the trunk system transmission fiber 8 leading to the optical transmit/receive terminal station 50b.

Here, the wavelength demultiplexing/multiplexing device 1 is connected to a branch terminal station 60 through the bi-directional transmission fibers 15, 25. Usually, an identical wavelength is selected for the wavelength of the optical signal to be dropped and the wavelength of the optical signal to be added.

Figure 24:
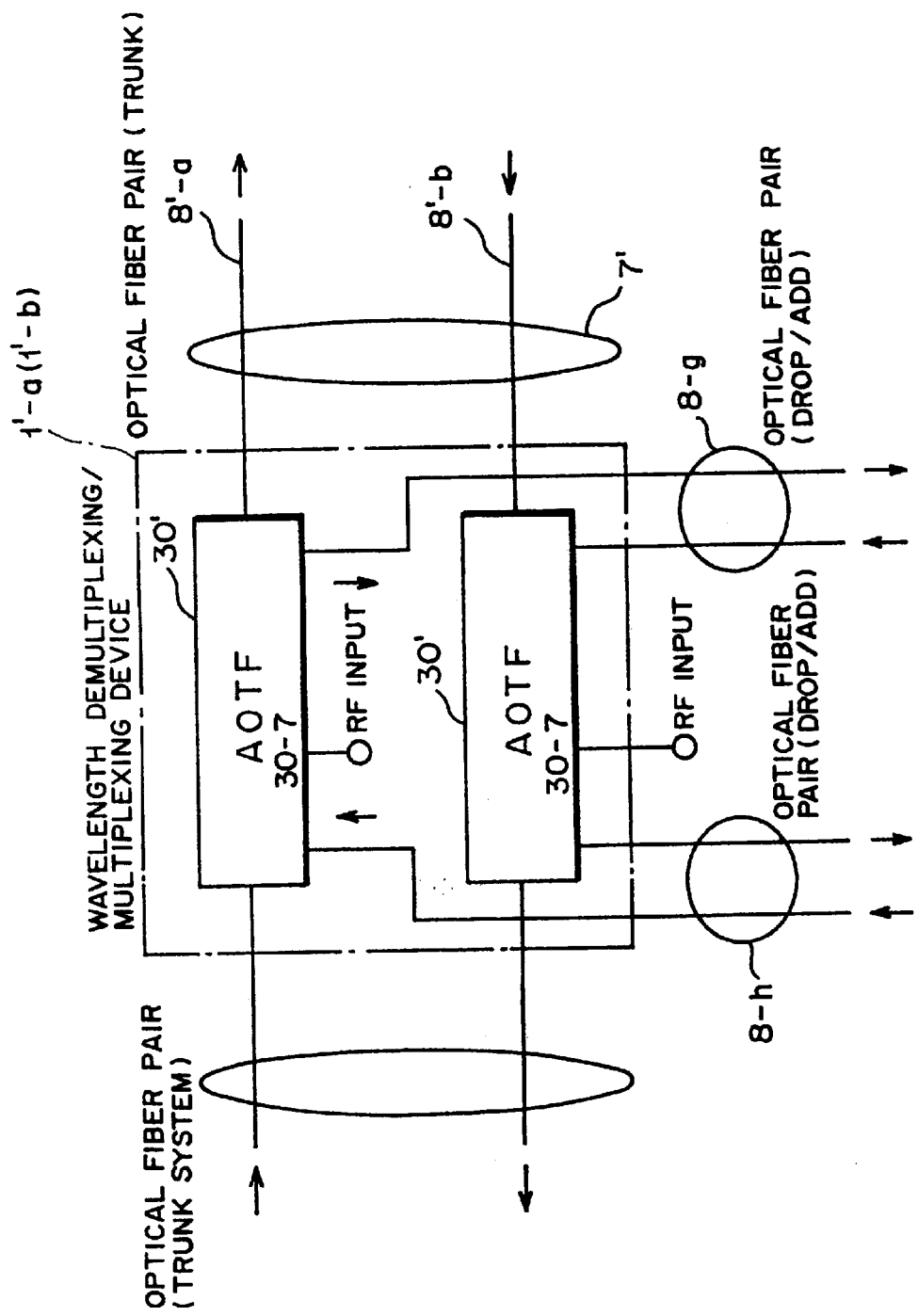
FIG. 24 is a block diagram illustrating a wavelength demultiplexing/multiplexing device using AOTFs.

In order to accomplish the foregoing, the wavelength demultiplexing/multiplexing device 1 is configured with an acousto-optical tunable filter (hereunder, referred to as "AOTF") 30, a first switching unit 10, and a second switching unit 20. The AOTF 30 (equivalent to the AOTF 30' in FIG. 24) is a device in which the acousto-optic effect is applied, and is able to control the output optical signals based on the RF signal supplied to a control port 30-7. The AOTF 30 executes a switch control so as to output the optical signals at terminals 01, 02, 01', 02', from a desired one of terminals 01, 02, 01', 02'. The following Table 1 illustrates the switch control of the input/output signals by the AOTF 30.

TABLE 1

| input terminal of optical signal | input signal | output termmal of light signal/output signal | |
| --- | --- | --- | --- |
| | | RF signal present | RF signal not present |
| 01 | λ-1, λ'-1 | 01'/λ'-1<br>02'/λ-1 | 01'/λ-1, λ'-1 |
| 02 | λ-3, λ'-3 | 01'/λ-3<br>02'/λ'-3 | 02'/λ-3, λ'-3 |
| 01' | λ-2, λ'-2 | 01/λ'-2<br>02/λ-2 | 01/λ-2, λ'-2 |
| 02' | λ-4, λ'-4 | 01/λ-4<br>02/λ'-4 | 02/λ-4, λ'-4 |

In the Table, the input terminal and the output terminal each signify an terminal. The optical signals propagating through the trunk optical fibers 8, 9 are input to the terminals 02, 02', and are output from the terminals 02, 02'. On the other hand, the optical signals propagating through the optical fiber 25 are input and output from the terminal 01, and the optical signals propagating through the optical fiber 15 are input and output to and from terminal 01'.

Further, since the light wavelength at which the acousto-optic effect is generated (the SAW frequency generated by the transducer) corresponds to a known RF signal frequency under a constant temperature, the AOTF 30 is able to select the optical signals to be output from the terminals 01, 02, 01', 02' by varying the RF signal frequency.

As shown in Table 1, for example, when the WDM signals $\lambda$-3, $\lambda'$-3 are input to terminal 02 from the optical transmit/receive terminal station 50a and the RF signal is ON and input to the control port 30-7, the AOTF 30 outputs, as a drop optical signal of a desired wavelength, the optical signal $\lambda$-3 into the optical fiber 15 as the bi-directional transmission line leading to the branch terminal station 60 from terminal 01'. Further, when the AOTF 30 receives the optical signals $\lambda$-1, $\lambda'$-1 propagating through the optical fiber 25 as the bi-directional transmission line, through the terminal 01, from the branch terminal station 60, the AOTF 30 outputs a desired optical signal $\lambda$-1 as an added optical signal from the terminal 02'.

When the WDM signals $\lambda$-3, $\lambda'$-3 are input to the terminal 02 from the optical transmit/receive terminal station 50a and the RF signal is OFF and not input to the control port 30-7, the AOTF 30 outputs from the terminal 02' the optical signals $\lambda$-3, $\lambda'$-3 toward the optical circulator 11 leading to the optical fibers 8, 9. Further, when the AOTF 30 receives the optical signals $\lambda$-1, $\lambda'$-1 at the terminal 01, from the branch terminal station 60 via fiber 25, the AOTF 30 outputs the optical signals $\lambda$-1, $\lambda'$-1 from the terminal 01'.

The optical signals in the parenthesis in FIG. 1 illustrate these when the RF signal is not input to the control port 30-7, in the state of the RF signal being OFF.

Further, the foregoing optical signals $\lambda$-3, $\lambda'$-3, $\lambda$-2, $\lambda'$-2, etc., each do not necessarily represent an optical signal of one wavelength, but may represent an optical signal containing a plurality of wavelengths.

When the RF signal is input to the AOTP 30, the wavelength of an optical signal on which the acousto-optic effect by the SAW exerts the influence is denoted by $\lambda$, on the other hand, the wavelength of an optical signal on which it does not exert the influence is denoted by $\lambda'$. That is, if a prime symbol "'" is used, the optical signal changes terminals depending on whether the RF signal is present. The i of $\lambda$-i indicates the terminal port number to which the optical signal $\lambda$-i is input.

The RF signal input to the control port 30-7 is supplied from an RF signal source (not illustrated), which is located inside the wavelength demultiplexing/multiplexing device 1. However, the RF signal source (not illustrated) alternatively may be provided in one of the optical transmit/receive terminal stations 50a, 50b, or in the branch terminal station 60. Hereunder, the embodiments will be described referring to the RF signal source being provided inside the wavelength demultiplexing/multiplexing device 1. However, it should be recognized that the RF signal source may also be installed outside the wavelength demultiplexing/multiplexing device 1.

When the RF signal source is provided at a place remote from the wavelength multiplexing/demultiplexing device 1, such as at the optical transmit/receive terminal station =b, the RF signal generated at station 50b can be converted into an optical signal and transmitted through one of the optical fibers 8, 9, 15 and 25. The optical signal can then be converted back to an RF signal and input to control port 30-7.

The first switching circuit 10 has an optical circulator connected to one of the terminals (02') of the AOTF 30. The switching unit 10 switches the input/output line from the AOTF 30 to the bi-directional optical transmission lines 8, 9. The optical circulator shown in FIG. 1 has three terminals, and transmits energy input from one terminal to an adjacent terminal, in a direction shown by the arrow. (The optical circulator could have a different number of terminals.) The optical circulator 11 has terminals C1, C2 and C3. The terminal C1 is connected to the optical fiber 9, the terminal C2 is connected to the terminal 02' of the AOTF 30, and the terminal C3 is connected to the optical fiber 8. When an optical signal is input from the terminal C1, the circulator 11 guides the optical signal in the direction shown by the arrow, and outputs the optical signal from terminal C2. That is, terminal C2 is the adjacent terminal to terminal C1. Similarly, optical signals input from terminal 02 of AOTF 30 enter the optical circulator 11 through terminal C2 and exit the optical circulator through terminal C3.

On the other hand, the second switching circuit 20 is connected to the other input/output pair of the AOTF 30. That is, switching circuit 20 is connected to terminals 01 and 02 of AOTF 30. The switching circuit 20 has an optical circulator 21 which switches the input/output line from terminal 02 to the optical fibers 8 and 9. The optical circulator 21 has three terminals and operates in the same manner as described above with regard to optical circulator 11. That is, an optical signal enters the optical circulator 21 at one terminal, is moved in the direction shown by the arrow, and exits the optical circulator 21 at the next adjacent terminal.

With the first switching unit 10, the second switching unit 20 and AOTF 30, the wavelength demultiplexing/multiplexing device 1 can add or drop optical signals having a desired wavelength. According to the structure described with reference to FIG. 1, optical signals $\lambda$-4 and $\lambda'$-4 propagate through optical fiber 9 from the transmit/receive terminal station 50b, and are input to terminal C1 of the optical circulator 11. Optical signals $\lambda$-4 and $\lambda'$-4 are output to terminals 02' of the AOTF via terminal C2 of the optical circulator 11. Similarly, the optical circulator 11 receives optical signals $\lambda$-1, $\lambda'$-3 ($\lambda$-3, $\lambda'$-3) from terminal 02' of the AOTF 30. These optical signals are applied to terminal C2 of the optical circulator 11 and output to terminal C3 having optical fiber 8 connected thereto.

Similarly, the second switching unit 20 receives optical signals $\lambda$-3, $\lambda'$-3 at terminal C1 of the optical circulator 21. The optical signals, which originated from optical transmit/receive terminal station 50a via optical fiber 8, are output to terminal 02 of the AOTF 30. Likewise, optical signals input to terminal C2 of optical circulator 21 are output from terminal C3 of optical circulator 21.

The optical signals input to terminals 01, 02, 01' and 02' are output from different terminals of the AOTF 30. Specifically, the AOTF 30 receives an RF signal at control port 30-7 to generate a surface acoustic wave (SAW) by a transducer in the AOTF 30. There is an acousto optic effect between the SAW and the input light. This allows the AOTF 30 to manipulate from where the optical signals are output, thus enabling AOTF 30 to add or drop specific wavelength components.

The AOTF 30 receives the optical signals $\lambda$-3, $\lambda'$-3 from transmit/receive terminal station 50a via terminal 02. Optical signal $\lambda$-3 is output from terminal 01' as a drop signal (RF input present). On the other hand, AOTF 30 receives optical signal $\lambda$-2, $\lambda'$-2 from the branch terminal station 60 via terminal 01'. AOTF 30 outputs optical signal $\lambda$-2 from terminal 02 when the RF signal is present, thus adding optical signal $\lambda$-2.

With the device shown in FIG. 1, optical signals can be switched with AOTF 30 and optical circulators 11, 21. Because the AOTF 30 has a bi-directional operation, and because optical circulators 11, 21 combine optical fibers, the number of AOTFs can be reduced.

(a1) Modification of the First Embodiment

Figure 2:
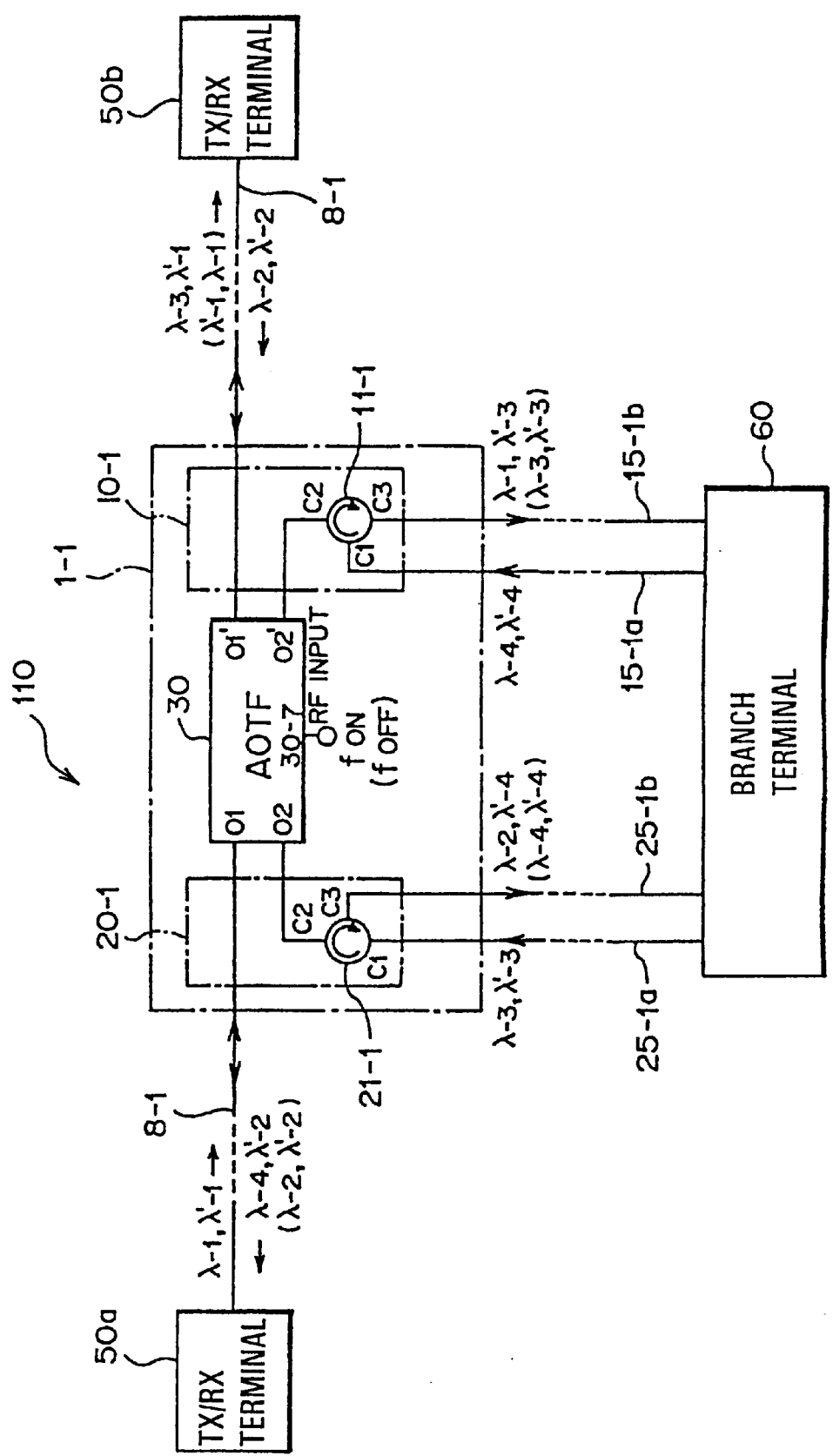
FIG. 2 is a block diagram illustrating a first modification to the WDM transmission system shown in FIG. 1.

FIG. 2 is a block diagram illustrating a modification to the WDM transmission system shown in FIG. 1. In the WDM transmission system 110 transmit/receive terminal stations 50a and 50b communicate through optical fiber 8-1. Optical fiber 8-1 is a bi-directional optical fiber in which signals travel in both directions. Like the device shown in FIG. 1, the demultiplexing/multiplexing device 1-1 is positioned between the optical transmit/receive terminal stations 50a and 50b.

The device 1-1 has first and second switching units 10-1, 20-1, each containing a three terminal optical circulator 11-1, 21-1. In this case, however, the lines leading from branch terminal station 60 are one-way transmission lines, whereas in FIG. 1, bi-directional transmission lines were used from terminal station 60. Drop lines 15-1b, 25-1b and add lines 15-1a, 25-1a are provided. Optical circulator 21-1 connects lines 25-1a and 25-1b to terminal 02 of AOTF 30. Similarly, optical circulator 11-1 connects optical lines 15-1a and 15-1b to terminal 02' of AOTF 30. Both optical circulator 21-1 and optical circulator 11-1 operate in the same manner as described with regard to FIG. 1.

As can be seen in FIG. 2, optical signals $\lambda$-4 and $\lambda'$-4 are supplied to terminal 02' of AOTF 30 via line 15-1a and terminals C1 and C2 of optical circulator 11-1. Similarly, optical signal $\lambda$-1, $\lambda'$-3 ($\lambda$-3, $\lambda'$-3) are supplied to branch terminal station 60 from terminal 02' of AOTF 30 via transmission line 15-1b, and terminal C3 and C2 of optical circulator 11-1. The AOTF 30 switches signals in the same manner shown in table 1 with regard to the first embodiment.

With regard to switching unit 20-1, optical signals $\lambda$-3, $\lambda'$-3 are provided from terminal station 60 to terminal 02 of AOTF 30 via transmission line 25-1a and terminals C1 and C2 of optical circulator 21-1. Optical signals $\lambda$-2, $\lambda'$-2 ($\lambda$-4, $\lambda'$-4) are sent from terminal 02 of AOTF 30 to branch terminal station 60 via terminals C2 and C3 of optical circulator 21-1 and transmission line 25-1b. With the switching units 10-1, 20-1 and the AOTF 30, the device 1-1 operates substantially the same as the device shown in FIG. 1. With the device shown in FIG. 2, fewer AOTFs are required, and thus, price is reduced.

(b) Second Embodiment

Figure 3:
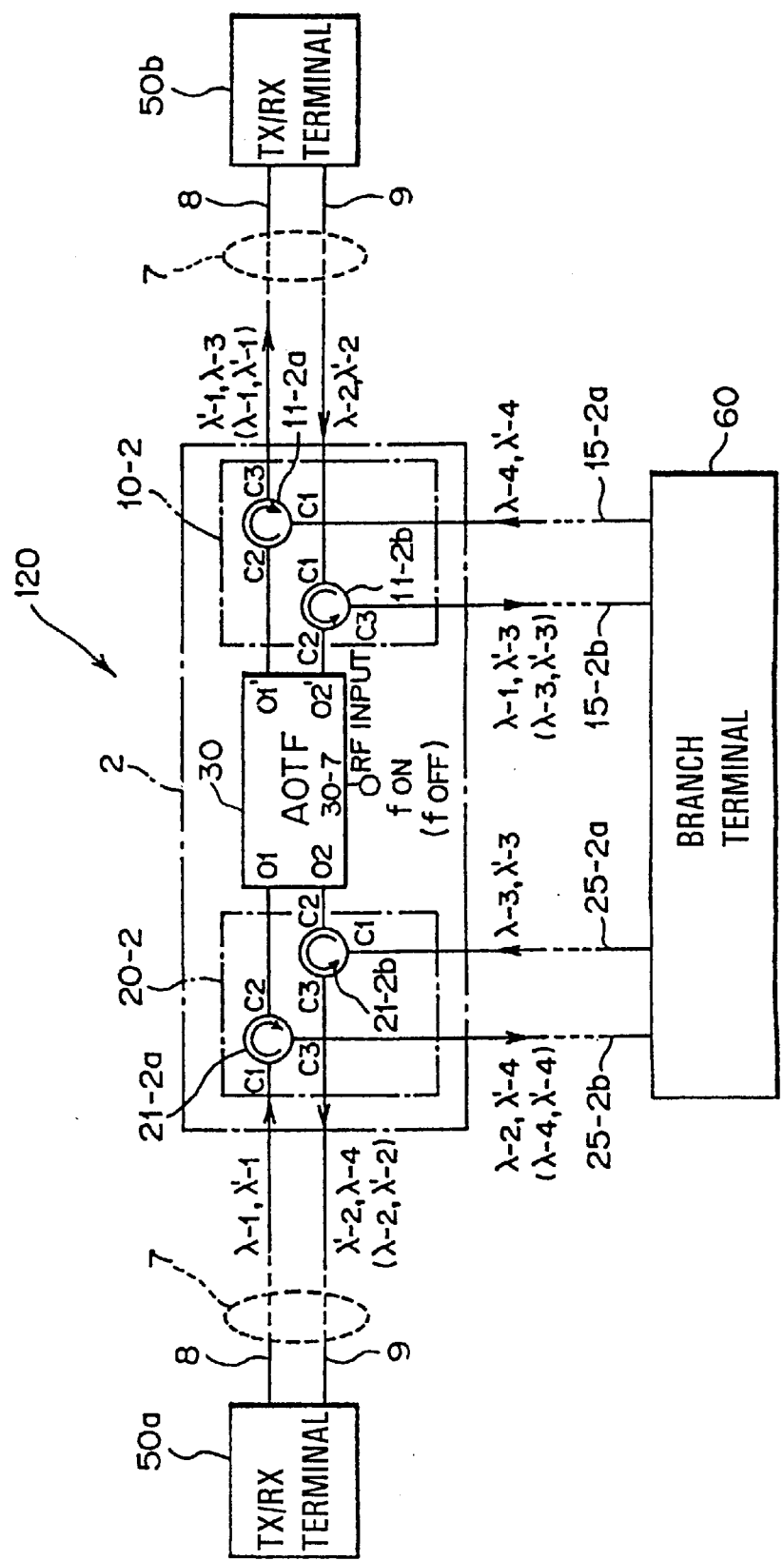
FIG. 3 is a block diagram illustrating a WDM transmission system employing a wavelength demultiplexing/multiplexing device related to a second embodiment of the present invention.

FIG. 3 is a block diagram illustrating a WDM transmission system employing a wavelength demultiplexing/multiplexing device of the second embodiment. The WDM transmission system 120 shown in FIG. 3 is substantially the same to the WDM transmission system 100 shown in FIG. 1 with the exception that in FIG. 3, all of the components 50a, 50b, 60 are connected to the demultiplexing/multiplexing device 120 via one way transmission lines. To the contrary, in FIG. 1, bi-directional transmission lines were used to connect branch terminal station 60.

The wavelength demultiplexing/multiplexing device 2 drops selected optical signals from the WDM signals ($\lambda$1, $\lambda$2, ..., $\lambda$n), which WDM signals are transmitted by the transmit/receive terminal station 50a and propagated through transmission fiber 8. The signals are dropped to branch terminal station 60 via drop transmission fiber 15-2b. Device 2 adds optical signals input from branch terminal station 60 via transmission fiber 25-2a. The signals are added to the other optical signals and output to transmit/ receive terminal station 50*b* via transmission fiber 8. Further, the wavelength demultiplexing/multiplexing device 2 drops selected optical signals from transmit/receive terminal station 50*b* to drop transmission fiber 25-2*b*. Device 2 adds optical signals from add transmission fiber 15-2*a* to transmission fiber 9, providing the added signals to transmit/receive terminal station 50*a*.

Usually, the same wavelength is used as the dropped wavelength and the added wavelength. The wavelength demultiplexing/multiplexing device has first and second switching units 10-2, 20-2. These switching units 10-2, 20-2 differ from the switching units 10, 20 shown in FIG. 1 in that switching units 10-2 and 20-2 each have two optical circulators. With this configuration, each of the trunk optical fibers 8, 9 is connected to a separate optical circulator. The optical circulators 11-2*a*, 11-2*b*, 21-2*a*, 21-2*b*, each operate in the same manner as the optical circulators described above.

The first switching unit 10-2 sends optical signals λ-4, λ'-4 from branch terminal station 60 to terminal 01' of AOTF 30 via transmission line 15-2*a* and optical circulator 11-2*a*. The first switching unit 10-2 also send the optical signals λ'-1, λ-3 (λ-1, λ'-1) from the terminal 01' of the AOTF 30 to the optical transmit/receive terminal station 50*b* via the optical circulator 11-2*a* and the optical fiber 8. The first switching unit 10-2 further sends the optical signals λ-2, λ'-2 from the optical transmit/receive terminal station 50*b* to terminal 02' of AOTF 30 via optical fiber 9 and optical circulator 11-2*b*. Yet further, first switching unit 10-2 sends optical signals λ-1, λ'-3 (λ-3, λ'-3) from terminal 02' of AOTF 30 to branch terminal station 60 via optical circulator 11-2*b* and drop line 15-2*b*.

The second switching unit 20-2 sends optical signals λ-1, λ'-1 from the optical transmit/receive terminal station 50*a* to terminal 01 of the AOTF 30 via optical fiber 8 and optical circulator 21-2*a*. Also, the second switching unit 20-2 sends optical signals λ-2, λ'-4 (λ-4, λ'-4) from terminal 01 of AOTF 30 to branch terminal station 60 via optical circulator 21-2*a* and drop line 25-2*b*. The wavelength demultiplexing/multiplexing device of the second embodiment drops and adds desired optical signals with the functions of the first switching unit 10-2, the second unit 20-2 and the AOTF 30. The wavelength of the signal dropped or added depends on the RF signal supplied to AOTF 30. More specifically, by varying the ON/OFF, the number and frequency of the RF signals, the wavelength of the optical signals is changed. The wavelength of the optical signals dropped and added corresponds to the RF signal frequency, which RF signal is input to control port 30-7 of AOTF 30. Of course, the optical signals are dropped and added as described above only when the RF signal is ON.

When the RF signal is ON and optical signals λ-1, λ'-1 are input to terminal 01, optical signal λ-1 is output to terminal 02' as a drop signal and optical signal λ'-1 is output to terminal 01'. In this case, the drop signal λ-1 is transmitted to the branch terminal station 60 via the optical circulator 11-2*b* and the drop line 15-2*b*.

Further, when the RF signal supplied to control port 30-7 is ON and optical signals λ-4, λ'-4 are supplied to terminal 01' from branch terminal station 60, optical signal λ-4 is output from terminal 02 as an add signal and optical signal λ'-4 is output from terminal 01. Here, optical signal λ-4 (an add signal) is transmitted to transmit/receive terminal station 50*a* through the optical circulator 21-2*b* and the system optical fiber 9.

On the other hand, when no RF signal is supplied to AOTF 30, namely RF signal is OFF, the wavelength demultiplexing/multiplexing device 2 does not drop or add optical signals. That is, the signals entering device 2 on lines 8 and 9 are the same signals exiting device 2 on optical fibers 8, 9. For example, optical signals λ-1, λ'-1 from optical transmit/receive terminal station 50*a* are propagated on optical fiber 8 and input at terminal C1 of the optical circulator 21-2*a*. These signals are transmitted to terminal 01 of AOTF 30 and output back to optical fiber 8 via terminal 01', and terminals C2 and C3 of optical circulator 11-2*a*. In this manner, the wavelength demultiplexing/multiplexing device of the second embodiment can switch optical signals with AOTF 30 and optical circulators 11-2*a*, 11-2*b*, 21-2*a*, 21-2*b*. The number of AOTFs required is thus reduced, as is the cost.

(b1) First Modification of the Second Embodiment

Figure 4:
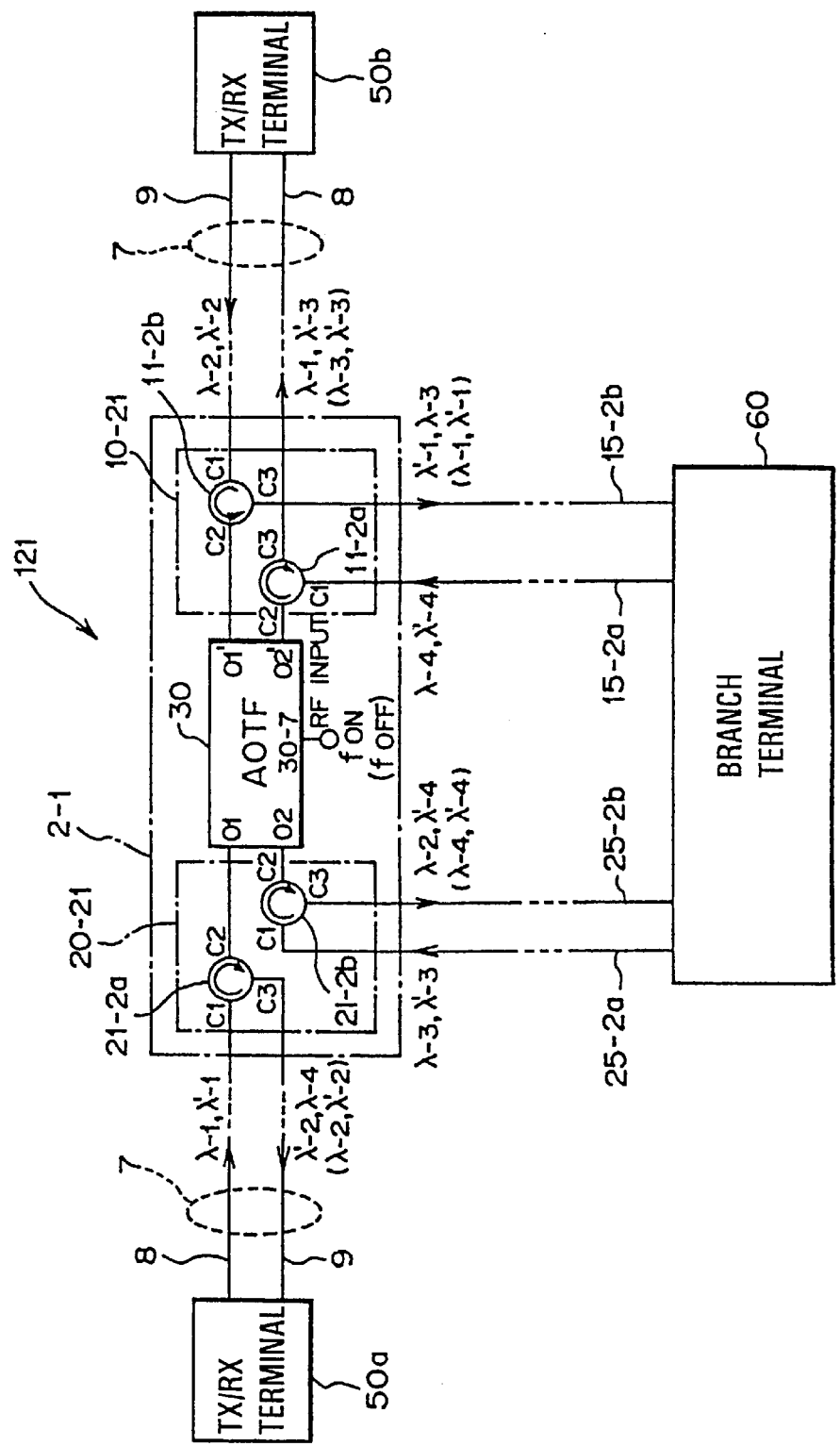
FIG. 4 is a block diagram illustrating a first modification to the WDM transmission system shown in FIG. 3.

FIG. 4 shows a WDM transmission system including a wavelength demultiplexing/multiplexing device, which device is a first modification of the second embodiment. The transmission system shown in FIG. 4 differs from that shown in FIG. 3 in the connections of optical circulators 21-2*a* and 21-2*b*. Otherwise, the device is substantially similar to that shown in FIG. 3, and has transmit/receive terminal stations 50*a* and 50*b* with wavelength demultiplexing/multiplexing device 2-1 therebetween. In the first switching unit 10-21, the optical fiber 9 is connected to terminal 01' of AOTF 30 via terminals C1 and C2 of optical circulator 11-2*b*. Terminal 02' of AOTF 30 is connected to optical fiber 8 via terminals C2 and C3 of optical circulator 11-2*a*.

On the other hand, in the second switching unit 20-21, both optical fibers 8 and 9 are connected to optical circulator 21-2*a*. Optical fiber 9 is connected to terminal C3 and optical fiber 8 is connected to terminal C1, with terminal C2 connected to terminal 01 of AOTF 30. Therefore, optical signals from transmit/receive terminal station 50 are transmitted to AOTF 30 via optical circulator 21-2*a*. On the other hand, optical signals λ'-2, λ-4 (λ-2, λ'-2) from the terminal 01 of AOTF 30 are transmitted to the transmit/receive terminal station 50 via the optical circulator 21-2*a* and optical fiber 9.

Optical circulator 21-2*b*, on the other hand, is connected to add line 25-2*a*, drop line 25-2*b* and terminal 02 of AOTF 30. Optical signals λ-3, λ'-3 from branch terminal station 60 are supplied to AOTF 30 via add line 25-2*a* and optical circulator 21-2*b*. Output signals from terminal 02 of AOTF 30, λ'-4, λ-2 (λ-4, λ'-4), are transmitted to branch terminal station 60 via terminals C2 and C3 of optical circulator 21-2*b* and drop line 25-2*b*.

The wavelength demultiplexing/multiplexing device 2-1 drops optical signals having selected wavelength. The optical signals are dropped from or added to the optical signals propagating through optical fibers 8, 9. The signals are selected by varying the ON/OFF state, the number and the frequency of the RF signal supplied to AOTF 30.

For example, optical signals λ-1, λ'-1 from the transmit/receive terminal station 50*a* are input to terminal 01 of AOTF 30 and output from terminal 01' or 02' of AOTF 30. When the RF signal is ON, optical signal λ-1 is output from terminal 02' and optical signal λ'-1 is output from terminal 01'. On the other hand, when an RF signal is not supplied to the AOTF 30, that is, RF signal is OFF, optical signals λ-1, λ'-1 from optical transmit/receive terminal station 50*a* are directed to branch terminal station 60 via optical fiber 8, terminal C1 and C2 of optical circulator 21-2*a*, terminals 01 and 01' of AOTF 30, terminals C2 and C3 of optical circulator 11-2*b* and drop line 15-2*b*. Also, when an RF signal is not supplied to control port 30-7, optical signals λ-3, λ'-3 from branch terminal station 60 are transmitted to the optical transmit/receive terminal station 50b via the add fiber 25-2a, terminals C1 and C2 of optical circulator 21-2, terminals 02 and 02' AOTF 30 and optical fiber 8. Therefore, when an RF signal is not supplied to AOTF 30, the device 2-1 drops all optical signals (λ-1, λ'-1) from the optical transmit/receive station 50a. Further, the device 2-1 sends all optical signals (λ-2, λ'-2) from the optical transmit/receive terminal station 50b to the optical transmit/receive terminal station 50a without dropping any signals.

(b2) Second Modification of the Second Embodiment

Figure 5:
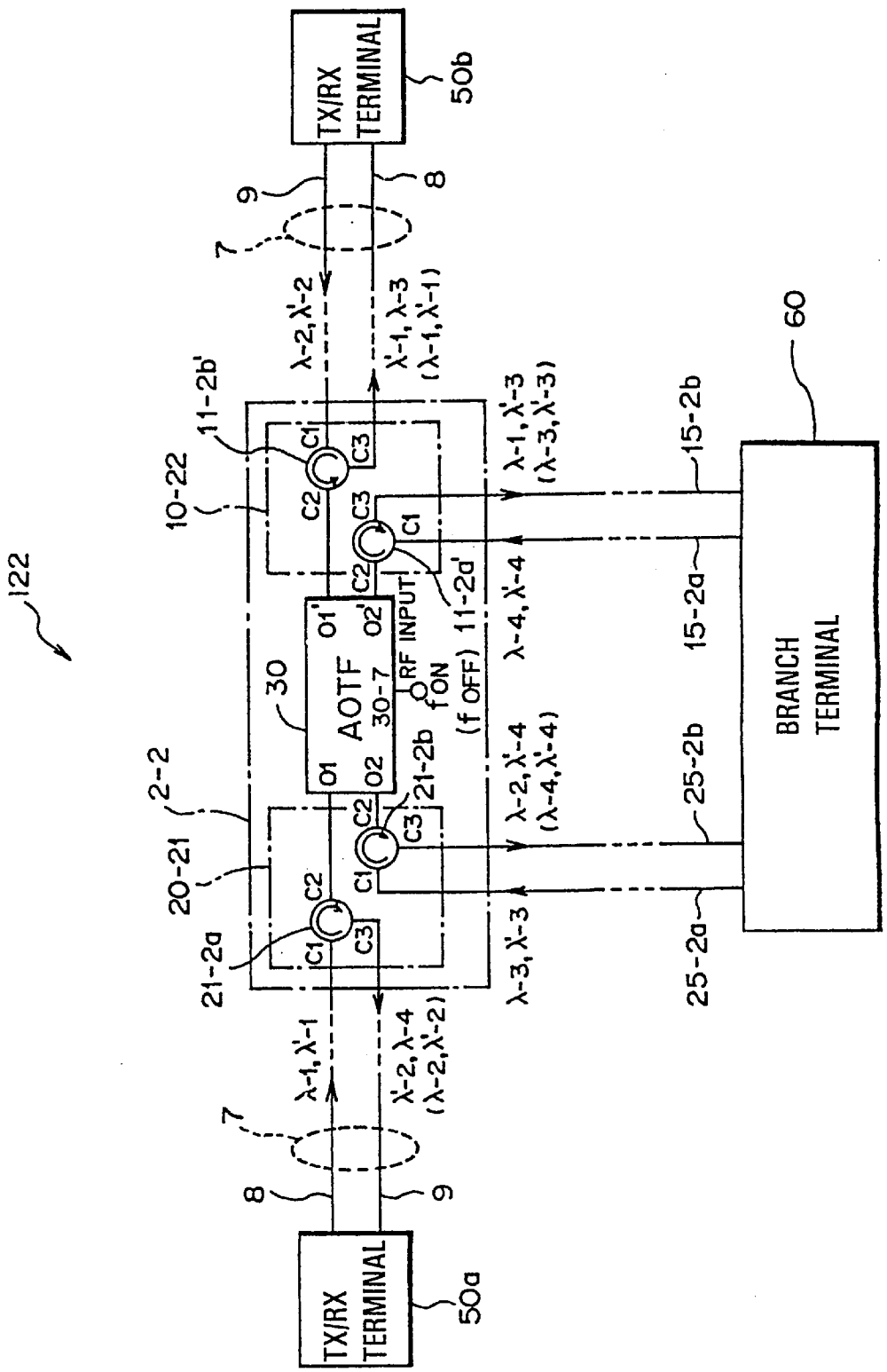
FIG. 5 is a block diagram illustrating a second modification to the WDM transmission system shown in FIG. 3.

FIG. 5 is a block diagram illustrating a WDM transmission system which includes a wavelength demultiplexing/multiplexing device according to a second modification of the second embodiment. In FIG. 5, both the first switching unit 10-21 and the second switching unit 10-22 are configured like the second switching unit 20-21 in FIG. 4. That is, terminals 02 and 02' of AOTF 30 are connected only to branch terminal station 60. The first switching unit 10-22 in FIG. 5 is different from the first switching unit 10-21 in FIG. 4. The difference lies in the connections of the optical circulators 11-2a', 11-2b'. For optical circulator 11-2b', terminal C1 is connected to optical transmit/receive terminal station 50b through optical fiber 9, terminal C2 is connected to terminal 01' of AOTF 30 and terminal C3 is connected to transmit/receive terminal station 50b through optical fiber 8.

In this manner, optical signals λ-2, λ'-2 from the optical transmit/receive terminal station 50b are transmitted to the AOTF 30 through the optical circulator 11-2b'. Also, optical signals λ'-1, λ-3 (λ-1, λ'-1) from terminal 01' of the AOTF 30 are transmitted to the optical transmit/receive terminal station 50b through the optical circulator 11-2b'.

For optical circulator 11-2a', terminal C1 is connected to the branch terminal station 60 through add line 15-2a, terminal C2 is connected to the terminal 02' of AOTF 30 and, terminal C3 is connected to the branch terminal station 60 through optical drop line 15-2b. Therefore, add optical signals λ-4, λ'-4 from the branch terminal station 60 are transmitted to the AOTF 30 through the optical circulator 11-2a'. Optical signals λ'-3, λ-1 (λ-3, λ'-3) from terminal 02' of AOTF 30 are transmitted to the branch terminal station 60 through the optical circulator 11-2a'.

In operation, when an RF signal is ON and supplied to control port 30-7 AOTF 30, device 2-2 drops from the optical signals propagating in optical fibers 8, 9, which correspond to the RF signal. Optical signals transmitted on add lines 25-2a, 15-2b are added to the optical signals travelling on fibers 8, 9 if the optical signals correspond to the RF signal.

For example, optical signals λ-1, λ'-1 from the optical transmit/receive terminal station 50a are input to terminal 01 of AOTF 30, and these optical signals λ-1, λ'-1 can be output from a selected one of terminals 01', 02' of AOTF 30. When the AOTF 30 is supplied with an RF signal at control port 30-7, optical signal λ-1 is output from terminal 02' and sent to the branch terminal station 60 via terminals C2 and C3 of optical circulator 11-2a' and drop line 15-2b. On the other hand, optical signal λ'-1 is output from terminal 01' and sent to the optical transmit/receive terminal station 50b via terminals C2 and C3 of optical circulator 11-2b' and optical fiber 8. The device 2-2 drops to branch terminal station 60, an optical signal corresponding to the RF signal (optical signal at which the acousto-optic effect is created with a surface acoustic wave generated by a transducer in the AOTF 30).

Optical signal λ-3, λ'-3 from branch terminal station 60 are input to terminal 02 of AOTF 30 and output from a desired one of terminals 01' and 02' of AOTF 30. When an RF signal is supplied to control port 30-7 optical signal λ-3 is output from terminal 01' of AOTF 30 and sent to the optical transmit/receive station 50b via terminals C2 and C3 of optical circulator 11-2b' and optical fiber 8. On the other hand, optical signal λ'-3 is output to terminal 02' and sent to the branch terminal station 60 via terminal C2 and C3 of optical circulator 11-2a' and drop line 15-2b. That is, device 2-2 adds signals supplied from add line 25-2a if the optical signal corresponds to the RF signal. The added signals are transmitted to optical transmit/receive terminal station 50b.

On the other hand, when no RF signal is supplied to control port 30-7, device 2-2 does not drop or add optical signals. The optical signals from optical transmit/receive terminal station 50a are supplied to optical transmit/receive terminal station 50b and vice versa.

(c) Third Embodiment

Figure 6:
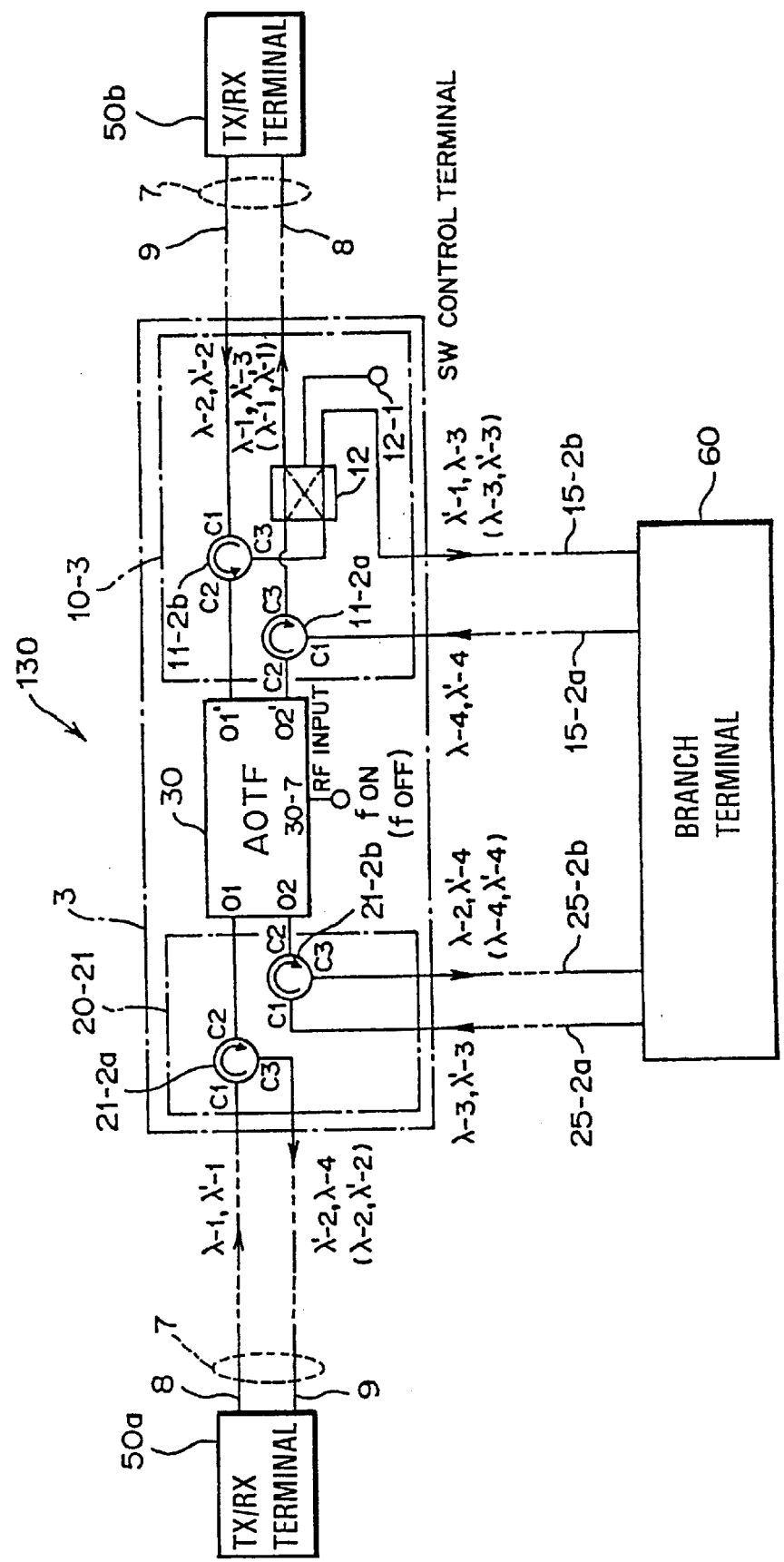
FIG. 6 is a block diagram illustrating a WDM transmission system employing a wavelength demultiplexing/multiplexing device related to a third embodiment of the present invention.

FIG. 6 is a block diagram illustrating a WDM transmission system which includes a wavelength demultiplexing/multiplexing device related to a third embodiment of the present invention.

As can be seen from FIG. 6, the second switching unit 20-21 is substantially the same as the second switching units 20-21 shown in FIGS. 4 and 5. The first switching unit 10-3, however, is different. The first switching unit 10-3 employs two optical circulators 11-2a, 11-2b. The optical circulators 11-2a, 11-2b switch between the optical fibers 8, 9, the drop line 15-2b and the add line 15-2a. The first switching unit 10-3 is provided with a switch (SW) 12, and the first switching unit 10-3 is different from the first switching units 10-2, 10-21, 10-22 of the second embodiment in this regard. Switch 12 acts as a forced switch unit.

Switch 12 is activated by SW control terminal 12-1 to forceably control switch 12. Switch 12 operates independently of the RF frequency supplied to port 30-7 of AOTP 30 and switches all wavelengths. However, a switching signal is generally supplied to control terminal 12-1 to switch 12 when the RF signal is input to control port 30-7. Although not limited, the switching signal will be described as a signal to turn the switch ON.

Figure 7A:
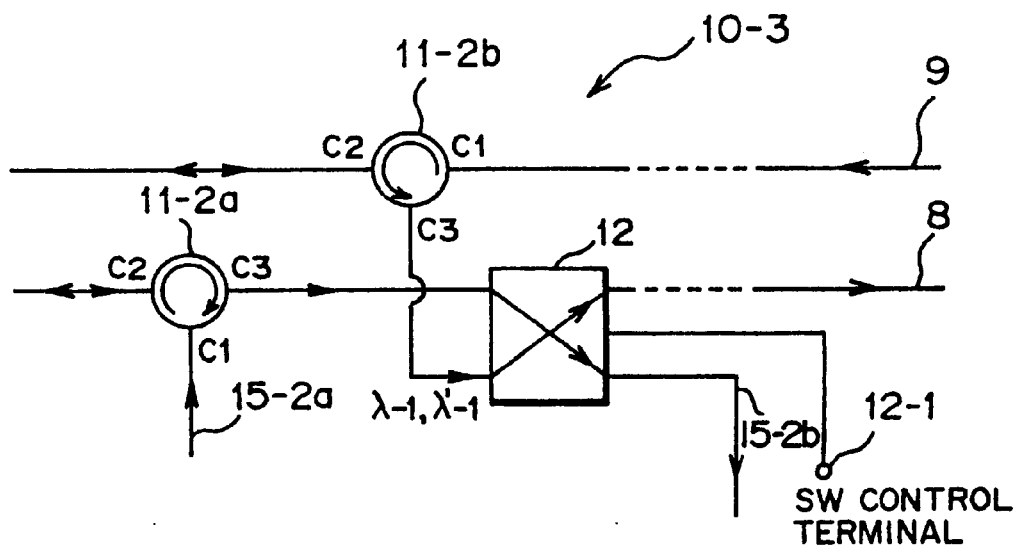
FIGS. 7(*a*) and 7(*b*) are block diagrams illustrating the operation of a switch of the WDM transmission system shown in FIG. 6.
Figure 7B:
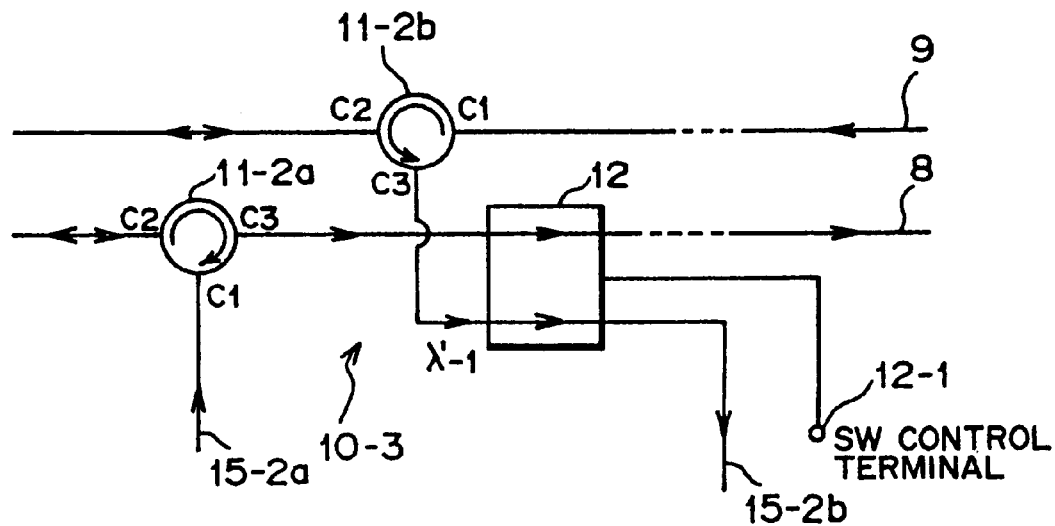

FIGS. 7(a) and 7(b) are block diagrams illustrating the operation of switch 12 related to the third embodiment. FIG. 7(a) illustrates how the switch 12 operates when the switch is OFF, and FIG. 7b illustrates how the switch 12 operates when the switch 12 is ON.

When the switch 12 is OFF, the switching signal is not supplied thereto. In this case, optical signals λ-1, λ'-1 from terminal C3 of the optical circulator 11-2b are forceably switched into the optical fiber 8 for transmission to optical transmit/receive terminal station 50b. On the other hand, when switch 12 is ON with the switch signal supplied thereto, optical signal λ'-1 from terminal C3 of the optical circulator 11-2b is switched to the optical drop line 15-2b. This of course assumes that the RF signal corresponding to λ-1 is being supplied to control port 30-7 at the same time the switching signal is being supplied to control terminal 12-1.

The wavelength demultiplexing/multiplexing device 3 selectively drops and adds signals. For example, as optical signals λ-1, λ'-1 are transmitted from optical transmit/receive terminal station 50 a and input at terminal 01 of AOTF 30, the optical signals λ-1, λ'-1 can be output from a selected one of terminals 01', 02' of AOTF 30. When an RF signal is supplied to control port 30-7 (RF signal is ON), optical signal λ-1 is output from terminal 02'. As mentioned above, when the RF signal is supplied, the switching signal is generally supplied concurrently. Accordingly, the optical signal λ-1 from terminal 02' of AOTF 30 is output to optical transmit/receive terminal station 50*b* through terminals C2 and C3 of optical circulator 11-2*a,* switch 12 (see FIG. 7(*b*)) and optical fiber 8. On the other hand, the optical signal λ'-1 applied to terminal 01 is output to the branch terminal station 60 via terminal 01' of AOTF 30, terminals C2 and C3 of optical circulator 11-2*b,* switch 12 (see FIG. 7(*b*)) and drop line 15-2*b*. That is, the wavelength demultiplexing/ multiplexing device 3 sends the optical signal (λ-1) corresponding to the RF signal to the optical transmit/receive terminal station 50*b*. The wavelength demultiplexing/ multiplexing device 3 drops the optical signal (λ'-1) not corresponding to the RF signal.

When an RF signal is not supplied to control port 30-7, the switch is generally OFF. In this case, the optical signals λ-1, λ'-1 input at terminal 01 of the AOTF 30 are output from terminal 01' of AOTF 30. Both optical signals λ-1, λ'-1 are sent out to optical transmit/receive terminal station 50*b* via terminals C2 and C3 of optical circulator 11-2*b,* switch 12 (see FIG. 7(*a*)) and optical fiber 8.

The device shown in FIG. 6 functions in a similar manner for optical signals input from fiber 9. More specifically, when optical signals λ-2, λ'-2 are input to terminal 01' of AOTF 30, the optical signals λ-2, λ'-2 are output from a selected one terminals 01, 02 of the AOTF 30. When AOTF 30 is supplied with the RF signal, switch 12 is generally ON. The optical signal λ-2 is sent from terminal 01' of AOTF 30 to terminal 02. From there, optical signal λ-2 is sent to the branch terminal station 60 via drop line 25-26. On the other hand, optical signal λ'-2 is output from the terminal 01 of AOTF 30, and sent out to the optical transmit/receive terminal station 50*a* via optical circulator 21-2*a* and optical fiber 9. Accordingly, the optical signal corresponding to the RF signal is sent to the branch terminal station 60, and the optical signal not corresponding to RF signal is sent to the optical transmit/receive terminal station 50*a*.

When the control port 30-7 of the AOTF 30 is not supplied with the RF signal, the wavelength demultiplexing/ multiplexing device 3 does not drop or add the optical signals propagating through the optical fibers 8, 9. Optical switch 12 allows for the direct control of which signals are sent to the branch terminal station 60 and the optical transmit/receive terminal station 50*b*. Optical switch 12 is provided outside of the AOTF 30, operates independently, and allows for when an optical signal is not totally added or totally dropped.

(d) Fourth Embodiment

Figure 8:
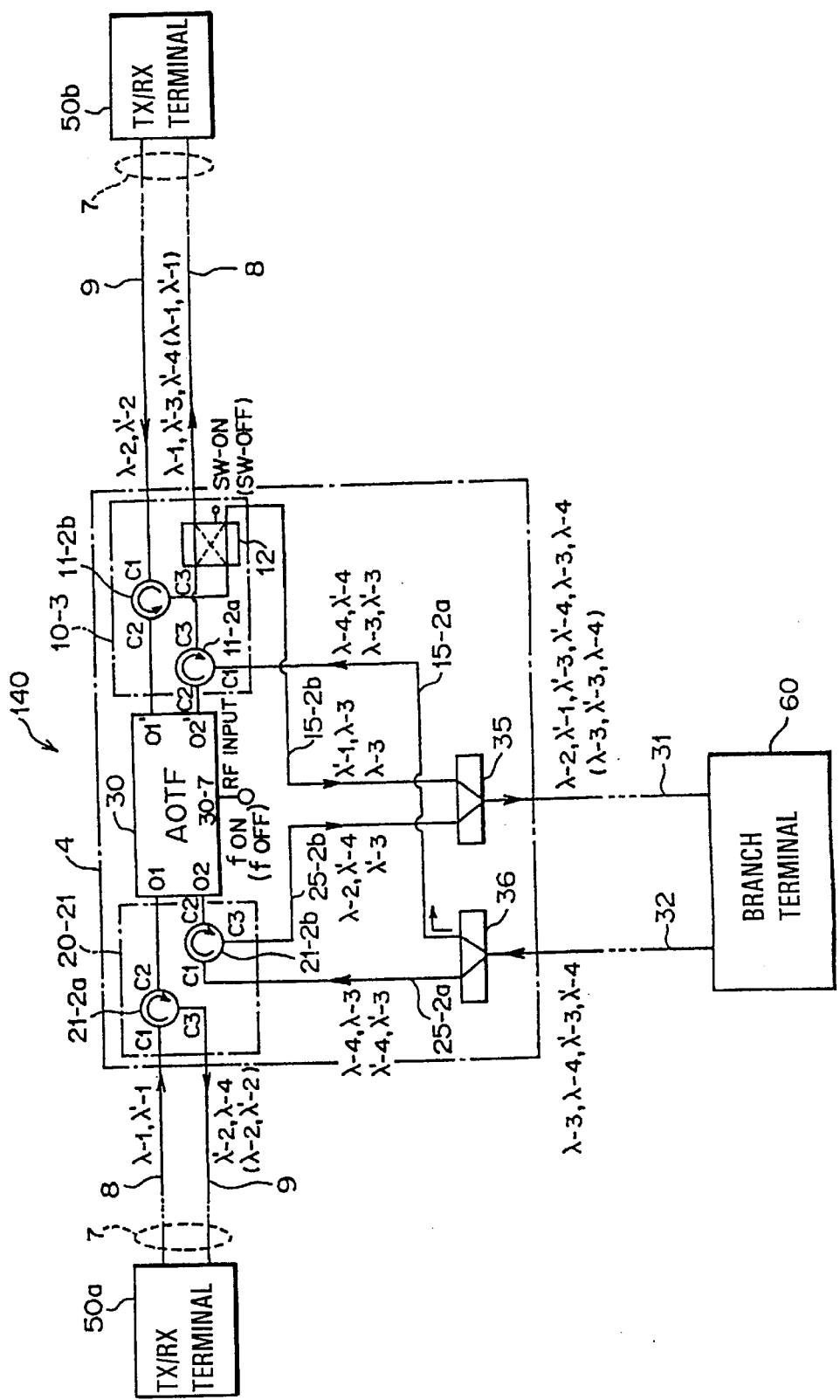
FIG. 8 is a block diagram illustrating a WDM transmission system employing a wavelength demultiplexing/multiplexing device related to a fourth embodiment of the present invention.

FIG. 8 is a block diagram of a WDM transmission system, which includes a wavelength demultiplexing/multiplexing device related to a fourth embodiment of the invention is applied. The fourth embodiment differs from the previous embodiments in that only two single direction optical fibers 31, 32 may be necessary to connect branch terminal station 60. A WDM transmission system 140 employs wavelength demultiplexing/multiplexing device 4 having a wavelength multiplexer 35 to multiplex optical signals from the first switching unit 10-3 and the second switching unit 20-21. A wavelength demultiplexer 36 is provided to split the optical signals from the branch terminal station 60 into the first switching unit 10-3 and the second switching unit 20-21. The optical signal transmitted from the first switching unit 10-3, propagating through optical drop line 15-2*b* and the optical signal transmitted from the second switching unit 20-21, propagating through the optical drop line 25-2*b* are multiplexed together by wavelength multiplexer 35 to be transmitted to branch terminal station 60 via optical fiber 31. Optical signals from the branch terminal station 60 travelling on optical fiber 32 are split by wavelength demultiplexer 36 into the add line 15-2*a* leading to the first switching unit 10-3 and the add line 25-2*a* leading to the second switching unit 20-21.

Figure 9:
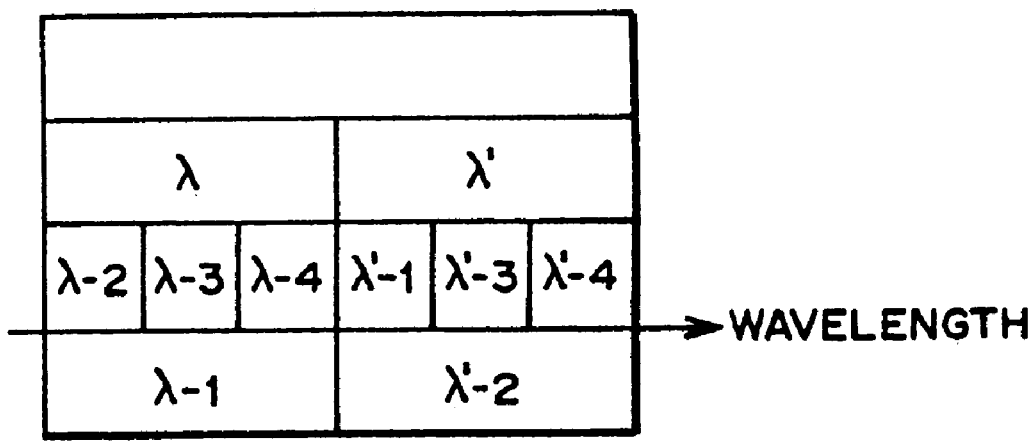
FIG. 9 is a chart illustrating a wavelength arrangement of the WDM transmission system shown in FIG. 8.

When the wavelength demultiplexing/multiplexing device 4 is provided with the wavelength demultiplexer 36 and the wavelength multiplexer 35, it has to be taken into account that the wavelength of the optical signal to propagate through the optical fiber 31 does not coincide with that of the optical signal to propagate through the optical fiber 32. FIG. 9 is a chart illustrating a wavelength arrangement of the WDM transmission system relating to the fourth embodiment of the invention. According to the example of the wavelength arrangement shown in FIG. 9, the band of optical signals in the optical fiber 8 that connects the optical transmit/receive terminal station 50*a* with the AOTF 30 is within the wavelengths λ-1, λ'-1, and the wavelengths λ'-3, λ'-4 cannot be used. On the other hand, the band of optical signals in the optical fiber 9 that connects the optical transmit/receive terminal station 50*b* with the AOTF 30 is within the wavelengths λ-2, λ'-2, and the wavelengths λ-3, λ-4 cannot be used. Thus, the wavelength arrangement shown in FIG. 9 has a certain restriction for a usable wavelength range.

According to the foregoing construction, the wavelength demultiplexing/multiplexing device 4 relating to the fourth embodiment of the invention drops and adds a desired optical signal. For example, optical signals λ-1, λ'-1 transmitted from the optical transmit/receive terminal station 50*a* are input to the terminal 01 of the AOTF 30 through the terminals C1 and C2 of the optical circulator 21-2*a*. The optical signals λ-1, λ'-1 can be output from a desired one of terminals 01', 02' of the AOTF 30.

Here, when the control port 30-7 of the AOTF 30 is supplied with an RF signal, namely, the RF signal is ON, the optical signal λ-1 is output from the terminal 02', and output to the optical transmit/receive terminal station 50*b* through the optical circulator 11-2*a* and the switch 12. On the other hand, the optical signal λ'-1 is output from the terminal 01', and output to the wavelength multiplexer 35 through the optical circulator 11-2*b,* the switch 12 and the optical drop line 15-2*b*. That is, the wavelength demultiplexing/ multiplexing device 4 sends the optical signal corresponding to the RF signal to the optical transmit/receive terminal station 50*b*. Further, the wavelength demultiplexing/ multiplexing device 4 drops the optical signals which do not correspond to the RF signal.

On the other hand, when the control port 30-7 of the AOTF 30 is not supplied with the RF signal, namely, the RF signal is OFF, the optical signals λ-1, λ'-1 from the optical transmit/receive terminal station 50*a* are output from the terminal 01' of the AOTF 30. Thereafter, the optical signals λ-1, λ'-1 are sent out to the switch 12 through the optical circulator 11-2*b*. The switch 12 forcibly switches the optical signals λ-1, λ'-1 into the trunk system optical fiber 8 to transmit the optical signals λ-1, λ'-1 to the optical transmit/ receive terminal station 50*b*.

Further, as the optical signals λ-2, λ'-2 from the optical transmit/receive terminal station 50*b* are input to terminal 01' of AOTF 30 through the terminals C1 and C2 of the optical circulator 11-2*b*. The optical signals λ-2, λ'-2 can be output from a selected one of terminals 01, 02 of the AOTF 30.

When the control port 30-7 of the AOTF 30 is supplied with the RF signal, the optical signal λ-2 is output from the terminal 02, and sent out to the wavelength multiplexer 35 through the optical circulator 21-2b and the drop line 25-2b. On the other hand, when the control port 30-7 of the AOTF 30 is not supplied with the RF signal, namely, the RF signal is OFF, the optical signals λ-2, λ'-2 from the optical transmit/receive terminal station 50b are output from the terminal 01 of the AOTF 30. Thereafter, the optical signals λ-1, λ'-1 are sent out to the optical transmit/receive terminal station 50a through optical circulator 21-2a.

Optical signals λ'-1, etc., transmitted from the first switching unit 10-3, propagating through the drop line 15-2b and the optical signals λ-2, etc., transmitted from the second switching unit 20-21, propagating through the drop line 25-2b are multiplexed by the wavelength multiplexer 35 to be transmitted into the optical fiber 31 to the branch terminal station 60.

Optical signals λ-4, λ-3, λ'-4, λ'-3 from the branch terminal station 60 are split by the wavelength demultiplexer 36 into the add line 15-2a leading to the first switching unit 10-3 and the add line 25-2a leading to the second switching unit 20-21. For example, the optical signals λ-4, λ-3, λ'-4, λ'-3 propagating through the add line 15-2a are input to the terminal 02' through the optical circulator 11-2a, and output from a desired one of terminals 01, 02.

Here, when the control port 30-7 of the AOTF 30 is supplied with the RF signal, the optical signals λ-4, λ-3 are output from the terminal 01, and transmitted to the optical transmit/receive terminal station 50a through the optical circulator 21-2a and the optical fiber 9.

In this manner, according to the wavelength demultiplexing/multiplexing device 4, the number of the optical fibers connecting between the wavelength demultiplexing/multiplexing device 4 and the branch terminal station 60 can be reduced, and the cost for making up the WDM transmission system can also be reduced.

Figure 10:
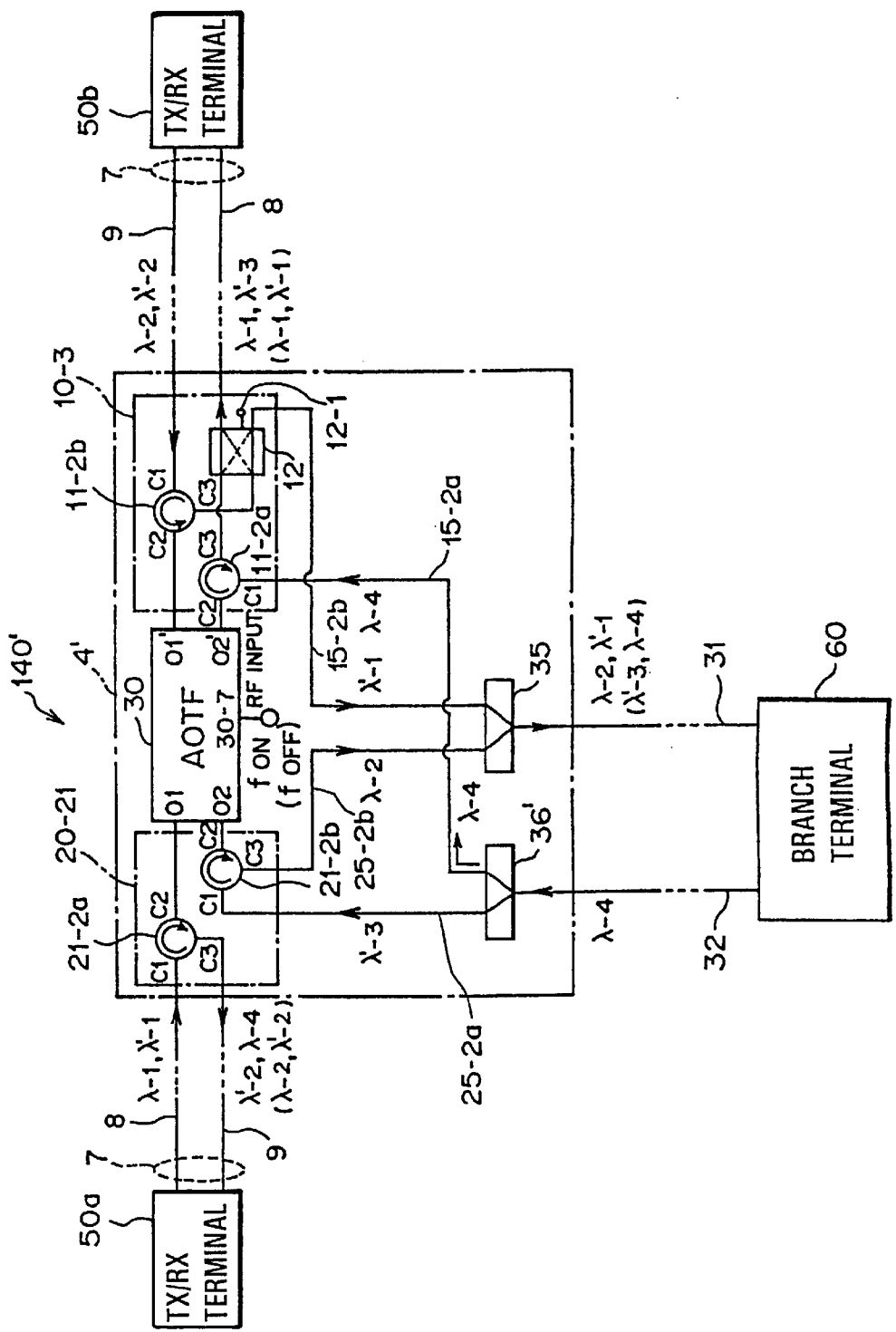
FIG. 10 is a block diagram to illustrating an application of the WDM transmission system shown in FIG. 8.

FIG. 10 is a block diagram illustrating a WDM transmission system in which a wavelength demultiplexing/multiplexing device 4' relating to an applied example of the fourth embodiment is applied.

The wavelength demultiplexing/multiplexing device 4' of the WDM transmission system 140' shown in FIG. 10 is different from that shown in FIG. 8 in that the wavelength demultiplexer 36' employs, an optical filter that splits the range of the wavelengths from the branch terminal station 60. For example, the wavelengths λ-3 and λ'-3 may be split from the wavelengths λ-4 and λ'-4.

FIG. 11 is a chart to illustrate an example of the wavelength arrangement of the WDM transmission system relating to the applied example of the fourth embodiment of the invention. If the wavelengths of the optical signals λ-3, λ'-4 in the wavelength demultiplexing/multiplexing device 4 relating to the foregoing fourth embodiment are used, the optical signals λ-3, λ'-4 return back to the direction of incidence. This condition will not be used in the operation of the WDM transmission system, and it is not necessary to allocate a wavelength range specially for the optical signals λ-3, λ'-4. Therefore, the wavelength arrangement shown in FIG. 11 can effectively use the wavelength range.

The wavelength demultiplexer 36' is designed in advance in consideration of the wavelengths λ, λ' to be split.

(d1) Modification of the Fourth Embodiment

Figure 12:
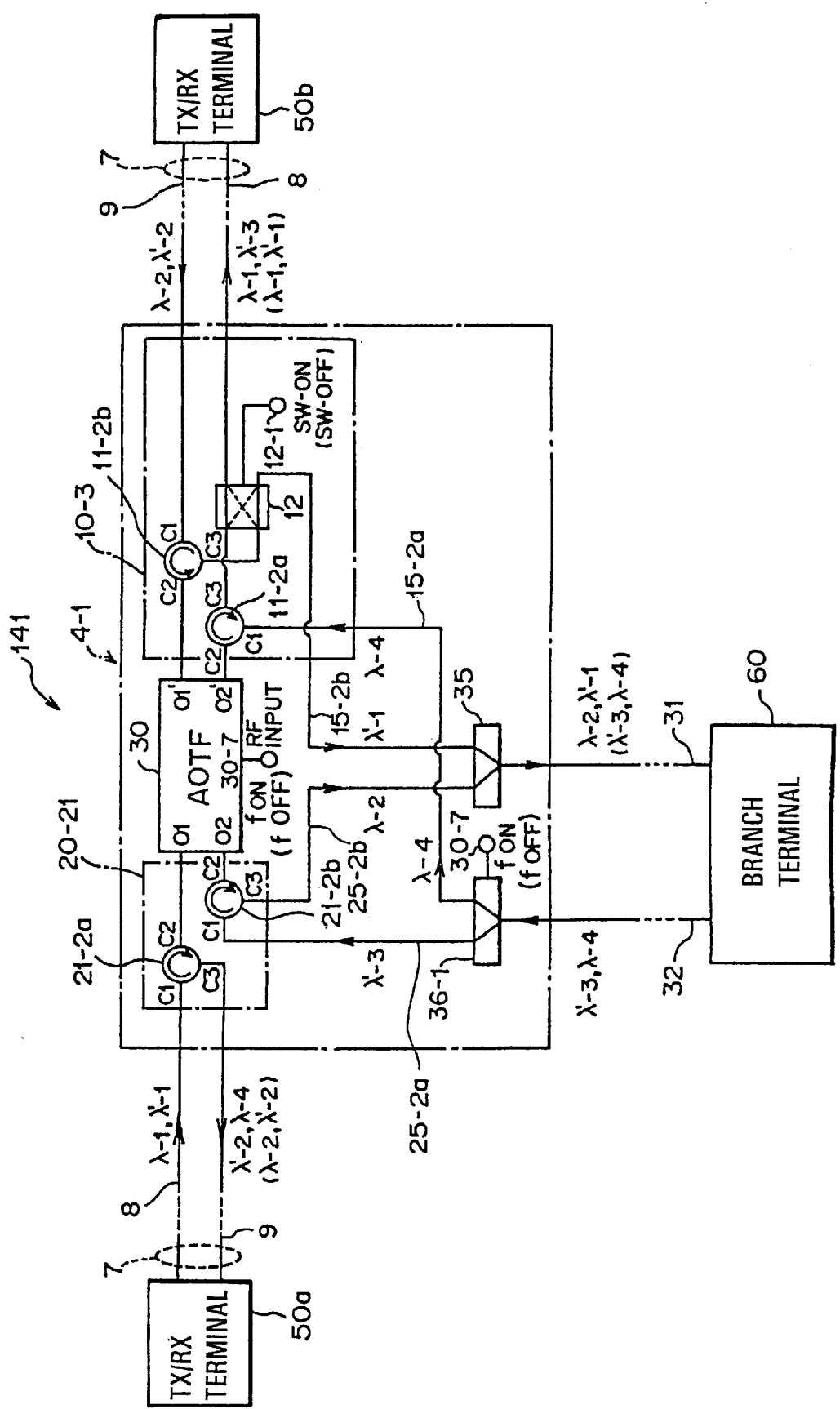
FIG. 12 is a block diagram illustrating a modification to the WDM transmission system shown in FIG. 8.

FIG. 12 is a block diagram illustrating a WDM transmission system which includes a wavelength demultiplexing/multiplexing device 4-1 relating to a first modification of the fourth embodiment of the invention is applied. The wavelength demultiplexing/multiplexing device 4-1 is different from the device shown in FIG. 8 in that the device shown in FIG. 12 is provided with an AOTF 36-1 instead of a demultiplexer 36.

The AOTF 36-1 serves as a demultiplexer, splits the optical signals from the branch terminal station 60, and sends out the split optical signals into the add line 15-2a leading to the first switching unit 10-3 and the add line 25-2a leading to the second switching unit 20-21.

When the RF signal is supplied to the control port 30-7, the AOTF 36-1 shown in FIG. 12 is able to split the wavelength range of the optical signal λ'-3 and the wavelength range of the optical signal λ-4. Under this condition, FIG. 13 is a chart to illustrate an example of the wavelength arrangement of the WDM transmission system 141 relating to the first modified example of the fourth embodiment of the invention. In this wavelength arrangement shown in FIG. 13, the wavelength allocation is determined such that the wavelengths of the optical signals do not coincide in one optical fiber.

The AOTF 36-1 and the AOTF 30 are supplied with the same RF signal at the control ports 30-7 thereof. Therefore, the wavelength selectivity of the AOTF 36-1 is interlocked to that of the AOTF 30.

According to the foregoing construction, the wavelength demultiplexing/multiplexing device 4-1 relating to the first modification example of the fourth embodiment sends out the optical signals λ'-3, λ-4 from the branch terminal station 60 into the desired add lines 15-2a, 25-2a via the AOTF 36-1 as a demultiplexer.

Concretely, when the control port 30-7 of the AOTF 36-1 is supplied with the RF signal, the optical signal λ'-3 is output from the terminal 01' of the AOTF 36-1. Thereafter, the signal λ'-3 is input to the terminal 02 of AOTF 30 through the optical circulator 21-2b, and then sent out from the terminal 02' to the optical transmit/receive terminal station 50b as the add optical signal. Further, the optical signal λ-4 is affected by the acousto-optic effect and output from the terminal 02' of AOTF 36-1. Thereafter, the signal λ-4 is input to the terminal 02' of the AOTF 30 through the optical circulator 11-2a, and then sent out from the terminal 01 to the optical transmit/receive terminal station 50a as the add optical signal.

In this manner, according to the wavelength demultiplexing/multiplexing device 4-1 relating to the first modification of the fourth embodiment, AOTF 36-1 is used as the demultiplexer, and AOTP 36-1 can be interlocked with AOTF 30. Further, in replacement of the AOTF 36-1, a variable optical filter can also be employed, so that the optical signals propagating through the trunk system optical fibers can be split in the same manner. Further, an AOTF can be used in place of multiplexer 35, thereby enhancing the flexibility of the wavelength selectivity.

(e) Fifth Embodiment

Figure 14:
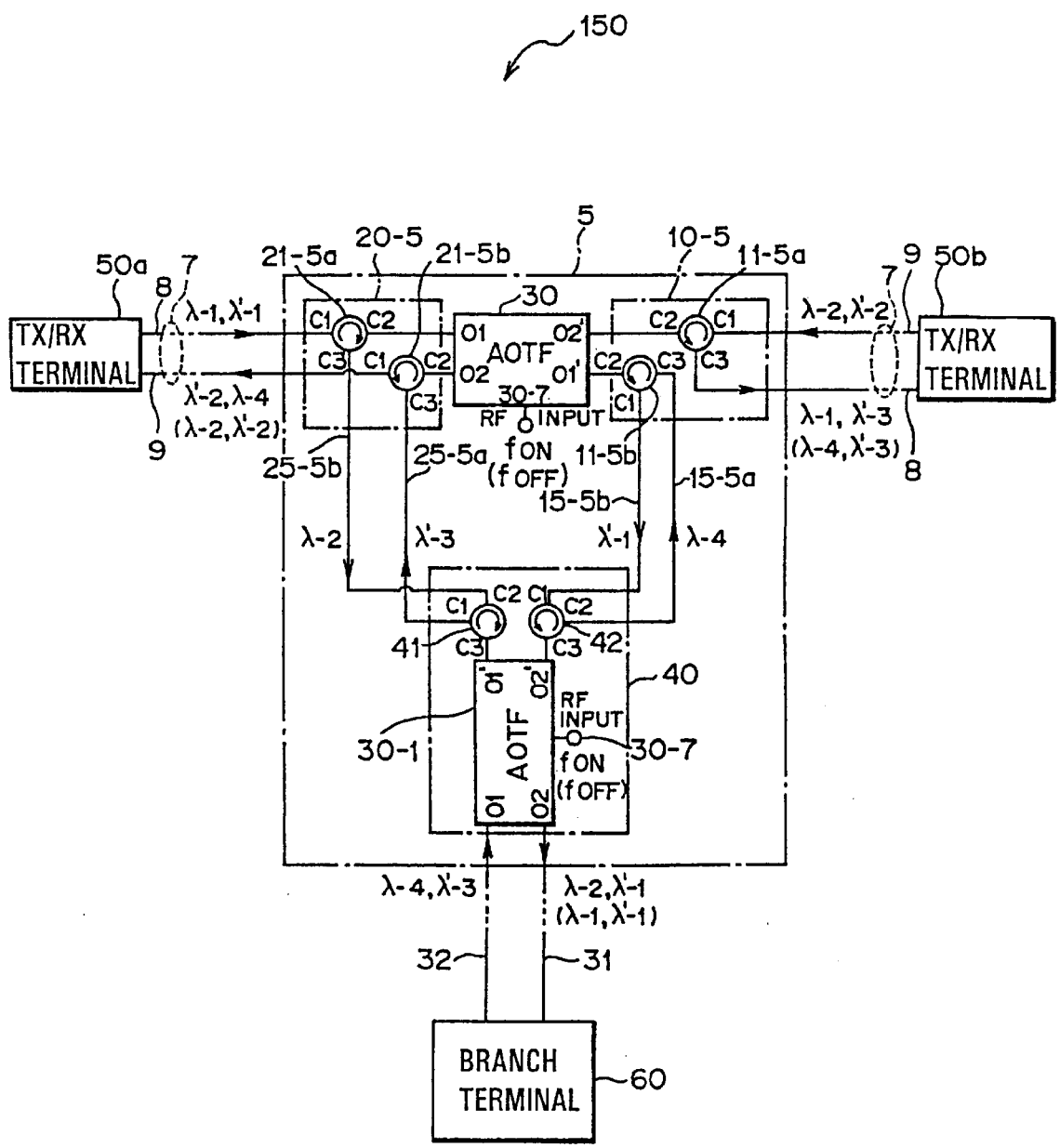
FIG. 14 is a block diagram illustrating a WDM transmission system employing a wavelength demultiplexing/multiplexing device related to a fifth embodiment of the present invention.

FIG. 14 is a block diagram illustrating a WDM transmission system which employs a wavelength demultiplexing/multiplexing device 5 relating to a fifth embodiment of the invention.

The wavelength demultiplexing/multiplexing device 5 differs from that of the fourth embodiment in the interconnections and in the provision of a wavelength demultiplexing/multiplexing unit 40 in place of elements 35 and 36. the first and second switching circuits 10-5, 20-5 are also configured somewhat differently.

The first switching unit 10-5 is provided with optical circulators 11-5a, 11-5b. In optical circulator 11-5a, terminal C1 is connected to the optical fiber 9, terminal C2 is connected to the terminal 02' of the AOTF 30, and terminal C3 is connected to the optical fiber 8. On the other hand, in optical circulator 11-5b, terminal C1 is connected to the drop line 15-5b, terminal C2 is connected to terminal 01' of the AOTF 30, and terminal C3 is connected to the add line 15-5a. The optical circulators of this embodiment operate in the same manner as the optical circulators described above.

The second switching unit 20-5 is provided with optical circulators 21-5a and 21-5b. In the optical circulator 21-5a, terminal C1 is connected to the optical fiber 8, terminal C2 is connected to terminal 01 of the AOTF 30, and terminal C3 is connected to the drop line 25-5b. On the other hand, in optical circulator 21-5b, terminal C1 is connected to the optical fiber 9, the terminal C2 is connected to the terminal 02 of the AOTF 30, and terminal C3 is connected to the add line 25-5a.

The wavelength demultiplexing/multiplexing unit 40 multiplexes the optical signals transmitted from the first switching unit 10-5 through the drop line 15-5b and the optical signals transmitted from the second switching unit 20-5 through the drop line 25-5b, and outputs the multiplexed optical signals toward the branch terminal station 60. Also, the wavelength demultiplexing/multiplexing unit 40 splits the optical signals from the branch terminal station 60, and outputs the split optical signals into the add line 15-5a leading to the first switching unit 10-5 and the add line 25-5a leading to the second switching unit 20-5.

In order to achieve the foregoing, the wavelength demultiplexing/multiplexing unit 40 is provided with an AOTF 30-1 and optical circulators 41, 42. The AOTF 30-1 is designed to have the same function and the same permeability as the foregoing AOTF 30. The RF signal supplied to the AOTF 30-1 is the same as that supplied to the AOTF 30. Therefore, the ATOF 30-1 is interlocked with the AOTF 30. The optical circulators 41, 42 each have the same function as that of the previously described optical circulators 11-5.

Referring to the first switching unit 10-5, the optical signal λ'-1 output from the terminal 01' of the AOTF 30 is sent out through the optical circulator 11-5b to the wavelength demultiplexing/multiplexing unit 40. The optical signal λ-4 from the wavelength demultiplexing/multiplexing unit 40 is sent out to the terminal 01' of the AOTF 30 through the optical circulator 11-5b. Optical signals λ-2, λ'-2 from the optical transmit/receive terminal station 50b are sent to terminal 02' of the AOTF 30 through the optical circulator 11-5a, and the optical signals λ-1, λ'-3 (λ-4, λ'-3) from the terminal 02' of the AOTF 30 are sent to the optical transmit/receive terminal station 50b through the optical circulator 11-5a.

Referring to the second switching unit, the optical signal λ'-2 output from the terminal 01 of the AOTF 30 is sent out through the optical circulator 21-5a of the second switching unit 20-5 to the wavelength demultiplexing/multiplexing unit 40. The optical signal λ'-3 from the wavelength demultiplexing/multiplexing unit 40 is sent to terminal 02 of the AOTF 30 through the optical circulator 21-5b. Optical signals λ-1, λ'-1 from the optical transmit/receive terminal station 50a are sent out to the terminal 01 of the AOTF 30 through the optical circulator 21-5a, and the optical signals λ'-2, λ-4 from terminal 02 of AOTF 30 are sent to the optical transmit/receive terminal station 50a through the optical circulator 21-5b.

Referring to the wavelength demultiplexing/multiplexing unit 40, when the RF signal is supplied to the control port 30-7 of the AOTF 30-1, the optical signal λ-2 propagating through the drop line 25-2b and the optical circulator 41 is input to the terminal 01' of AOTF 30-1. And then, the output line of the optical signal λ-2 is switched by the acousto-optic effect by the SAW, and output from terminal 02, along with the optical signal λ'-1, which does not correspond to the RF signal. Further, the optical signals λ-4, λ'-3 from the branch terminal station 60 are input to terminal 01, and the output line of the optical signal λ-4 (λ-4 corresponds to the RF signal) is switched to the terminal 02' from the terminal 01. Thus, optical signal λ-4 is output from the terminal 02 '.

Therefore, the wavelength demultiplexing/multiplexing device 5 drops and adds a desired optical signal by the functions of the first switching unit 10-5, the second switching unit 20-5, the AOTF 30, and the wavelength demultiplexing/multiplexing unit 40. In this manner, the wavelength demultiplexing/multiplexing device 5 relating to the fifth embodiment is provided with AOTF 30-1 having both the functions of the wavelength multiplexer and the wavelength demultiplexer while being interlocked with the AOTF 30, thereby reducing the number of the optical fibers, and further simplifying the construction of the device.

Figure 15:
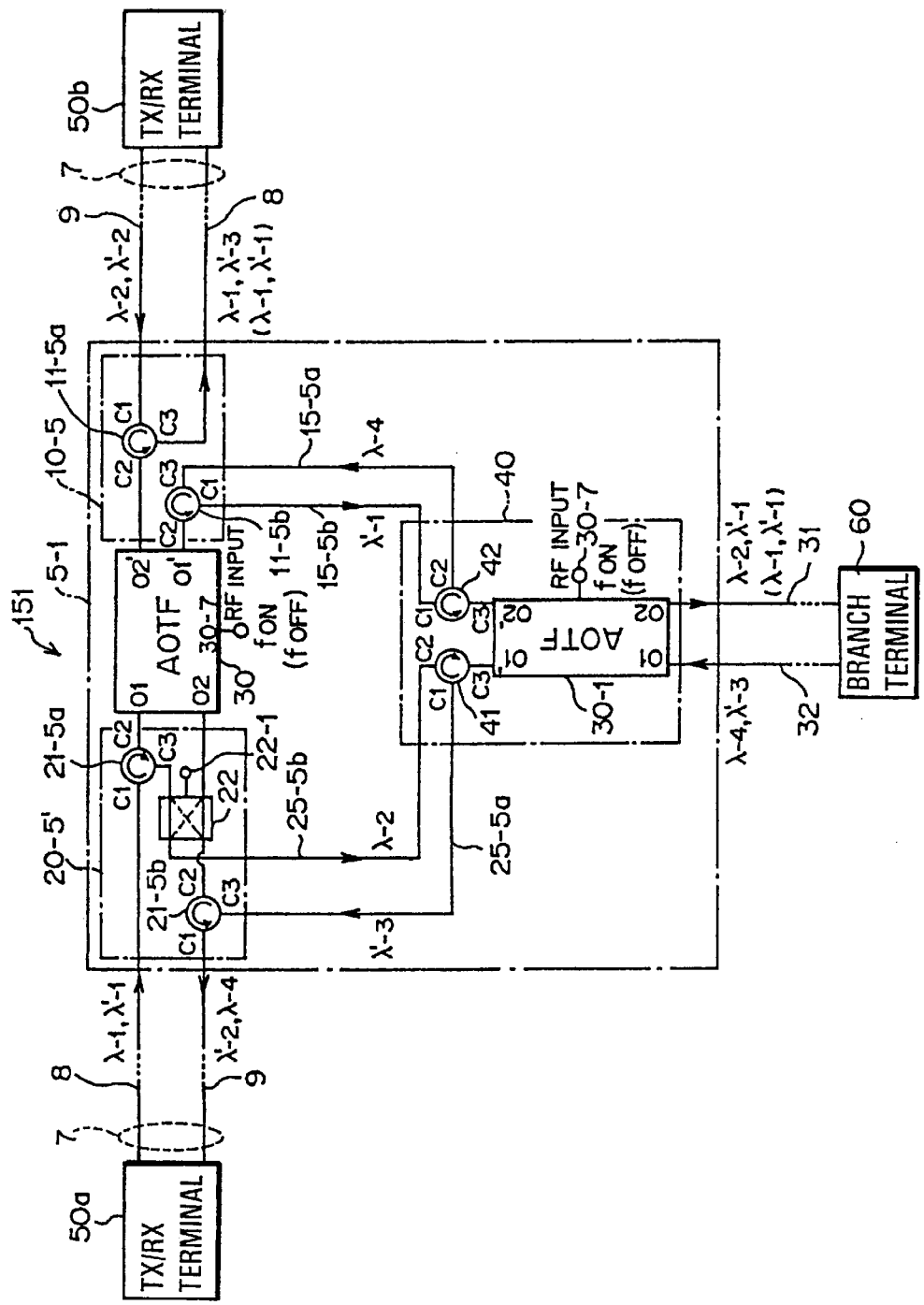
FIG. 15 is a block diagram illustrating an application of the WDM transmission system shown in FIG. 14.

FIG. 15 is a block diagram illustrating a WDM transmission system which uses a wavelength demultiplexing/multiplexing device 5-1 relating to an applied example of the fifth embodiment. The wavelength demultiplexing/multiplexing device 5-1 of the WDM transmission system 151 shown in FIG. 15 is provided with a switch (SW) 22 as a forced switch unit in a second switching unit 20-5', and this is different from the wavelength demultiplexing/multiplexing device 5 related to the fifth embodiment.

The switch 22 forcibly switches the transmission line of the optical signal. When a switching signal is received at a SW control terminal 22-1, the switch 22 switches the transmission line of the optical signal. The switching signal used in this case is an information to switch the switch 22 into the ON state, and this switching signal is supplied when the RF signal is input to the control port 30-7 of the AOTF 30.

Figure 16A:
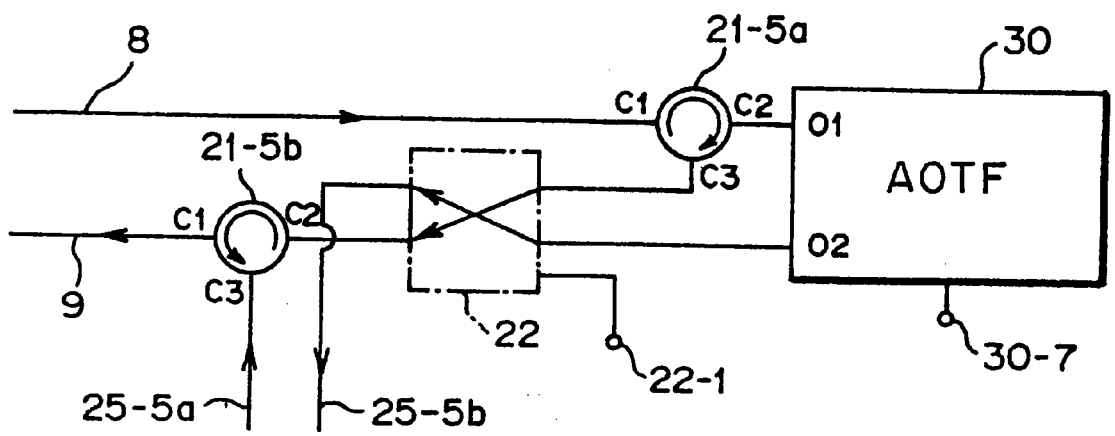
FIGS. 16(*a*), 16(*b*) are block diagrams illustrating the operation of a switch relating of the WDM transmission system shown in FIG. 15.
Figure 16B:
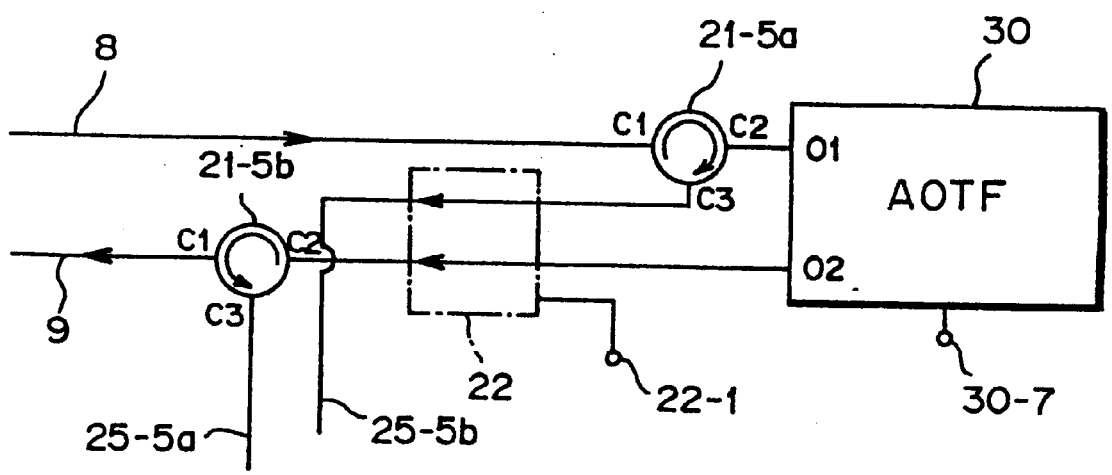

FIGS. 16(a) and (b) are block diagrams to explain the operation of the switch 22 relating to the applied example of the fifth embodiment. FIG. 16(a) illustrates how switch 12 operates when switch 22 is OFF, and FIG. 16(b) illustrates how switch 22 operates when switch 22 is ON.

When the switch 22 is OFF, the transmission line of optical signals from the terminal C3 of the optical circulator 21-5a is forcibly switched into the trunk system optical fiber 9 to be transmitted to the optical transmit/receive terminal station 50a. When the switch 22 is ON, it operates as shown in FIG. 16(b)

(f) Sixth Embodiment

Figure 17:
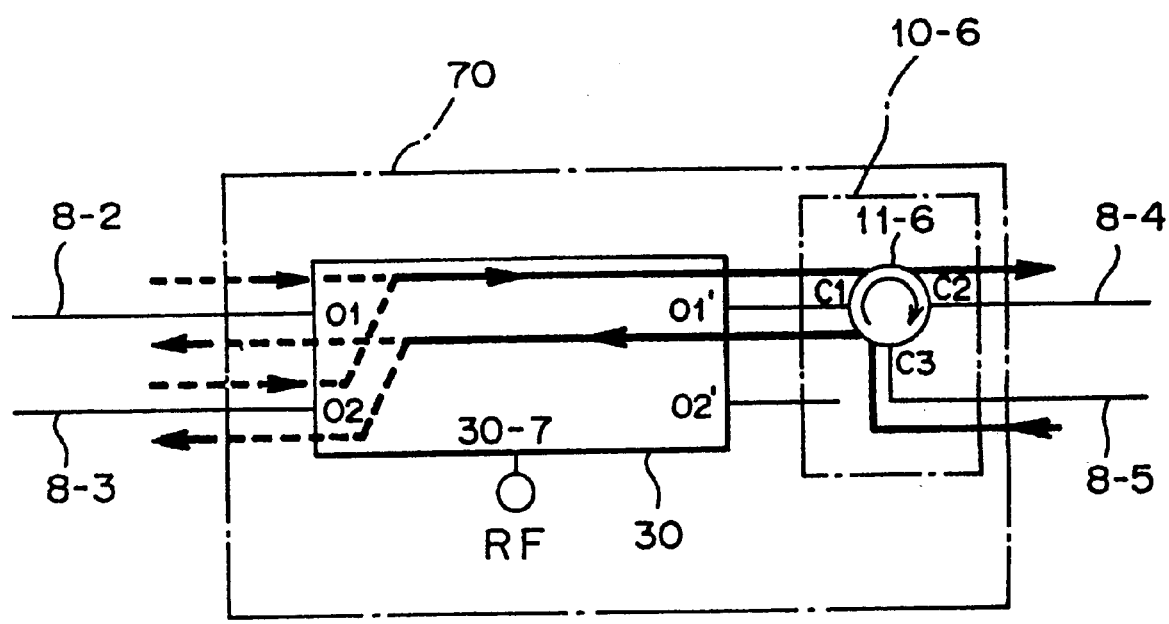
FIG. 17 is a block diagram illustrating a bi-directional wavelength switching device related to a sixth embodiment of the invention.

FIG. 17 is a block diagram to illustrate a bi-directional wavelength switching device 70 related to a sixth embodiment of the invention. The bi-directional wavelength switching device 70 shown in FIG. 17 switches a transmission line of an optical signal, and is configured to switch the optical signals propagating through bi-directional optical fibers 8-2, 8-3, 8-4, and 8-5 into desired transmission lines.

The bi-directional wavelength switching device 70 is provided with the AOTF 30 and a first switching unit 10-6.

The AOTF 30 is provided with two pairs of terminals, including a first pair of terminals 01, 02, and a second pair having a pair of terminals 01', 02'. If a plurality of optical signals having different wavelengths are input to terminal 01, for example, the AOTF 30 is able to output a part of the optical signals from terminal 01' to which an optical signal is not input, and to output the rest of the optical signals from the other terminal 02'. Further, if optical signals are input to the other terminals 02, 01', and 02', the AOTF 30 is designed to output the optical signals from a desired terminal in the same manner as the foregoing.

The first switching unit 10-6 is connected to the terminal 01' of the AOTF 30, and switches the input/output lines of the optical signals between the AOTF 30 and the bi-directional optical signal transmission line 8-4 and 8-5, by using an optical circulator 11-6.

Optical circulator 11-6 operates in the same manner as the previous optical circulators.

According to the foregoing construction, first the optical circulator 11-6 switches the line of the optical signal input through the optical fiber 8-5 to terminal 01 ' of the AOTF 30. When the RF signal is supplied to control port 30-7, the AOTF 30 outputs the optical signals corresponding to the frequency of the SAW from terminal 02, and outputs the optical signals not corresponding from the terminal 01. When the RF signal is not input, the AOTF 30 outputs the optical signals input at terminal 01' (from the terminal C1 of the optical circulator 11-6) from the terminal 01.

Therefore, the bi-directional wavelength switching device 70 sends out an optical signal into a desired transmission line by combining the functions of the AOTF 30 and the first switching unit 10-6. In this manner, according to the bi-directional wavelength switching device relating to the sixth embodiment of the invention, the optical signals can be switched by combining the bi-directionally operational AOTF 30 with the first switching unit 10-6, and the number of AOTFs to be equipped can be reduced to lower the production cost of the device, thus making a simplified device.

Further, the bi-directional wavelength switching device 70 can be supplied as a component to achieve the basic function of selecting the wavelength of an optical signal, and adding and dropping optical signals in a wavelength demultiplexing/multiplexing device (for example, OADM-BU or OADM-NODE) used in the WDM transmission system. That is, any of the optical fibers 8-2, 8-3, 8-4, and 8-5 can be used as an drop line and an add line in the foregoing bi-directional wavelength switching device 70. There are wide variations possible as to the terminals where the optical circulator 11-6 is equipped.

Figure 18:
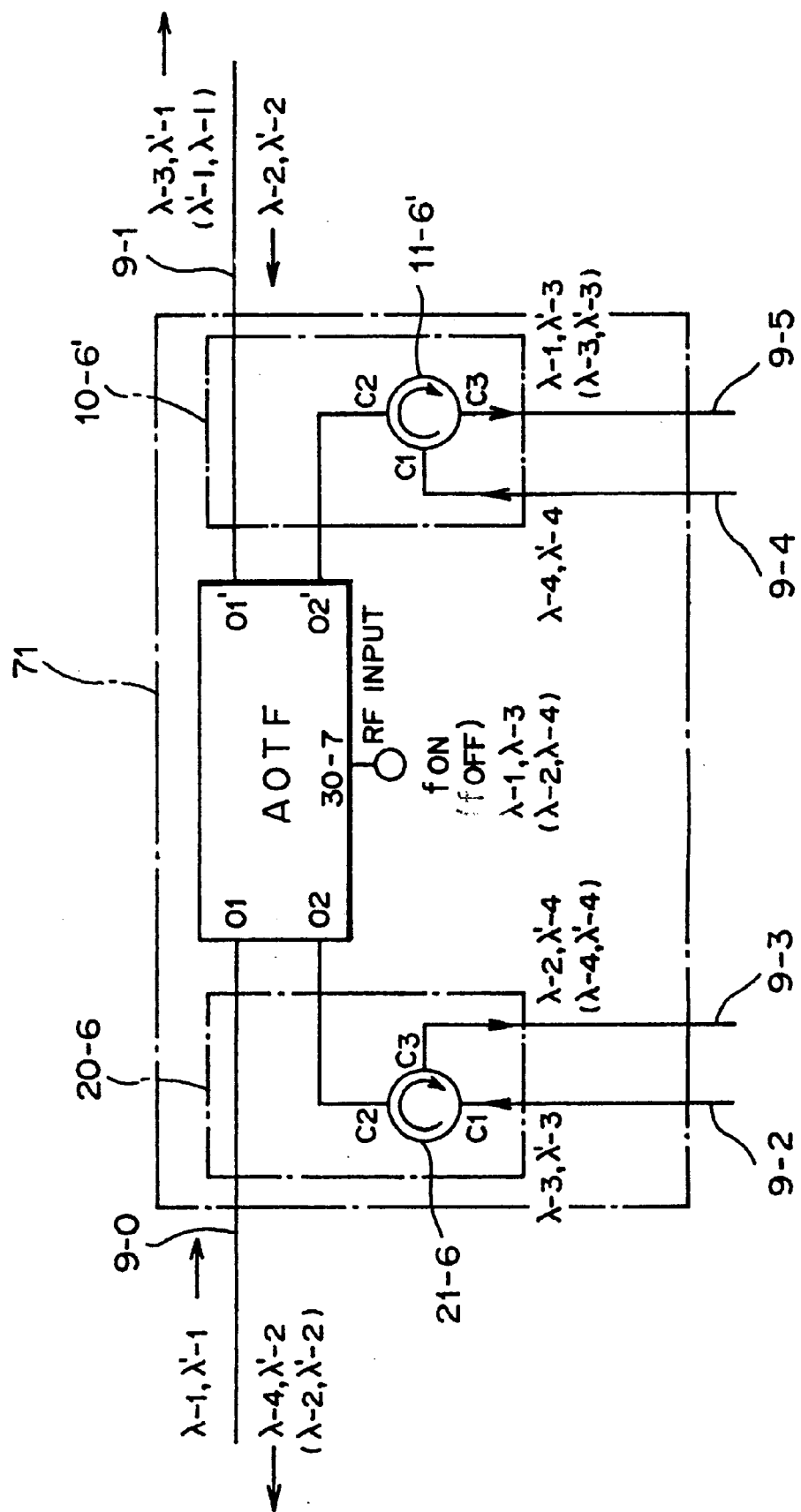
FIG. 18 is a block diagram illustrating a modification to the bi-directional wavelength switching device shown in FIG. 17.

FIG. 18 is a block diagram to illustrate a bi-directional wavelength switching device 71 related to a modification of the sixth embodiment of the invention. The bi-directional wavelength switching device 71 shown in FIG. 18 is provided with a second switching unit 20-6 on the side of the terminals 01, 02, opposite to a first switching unit 10-6' and is different from the foregoing bi-directional wavelength switching device 70.

The first switching unit 10-6' and the second switching unit 20-6 switch the input optical signals between the AOTF 30, and optical fibers 9-0, 9-1, 9-2, 9-3, 9-4, and 9-5. In order to achieve the foregoing, the first switching unit 10-6' and the second switching unit 20-6 are provided with optical circulators 11-6' and 21-6, respectively. Further, the optical fibers 9-2 and 9-3, or the optical fibers 9-4 and 9-5 can be paired as an optical fiber pair.

Figure 19:
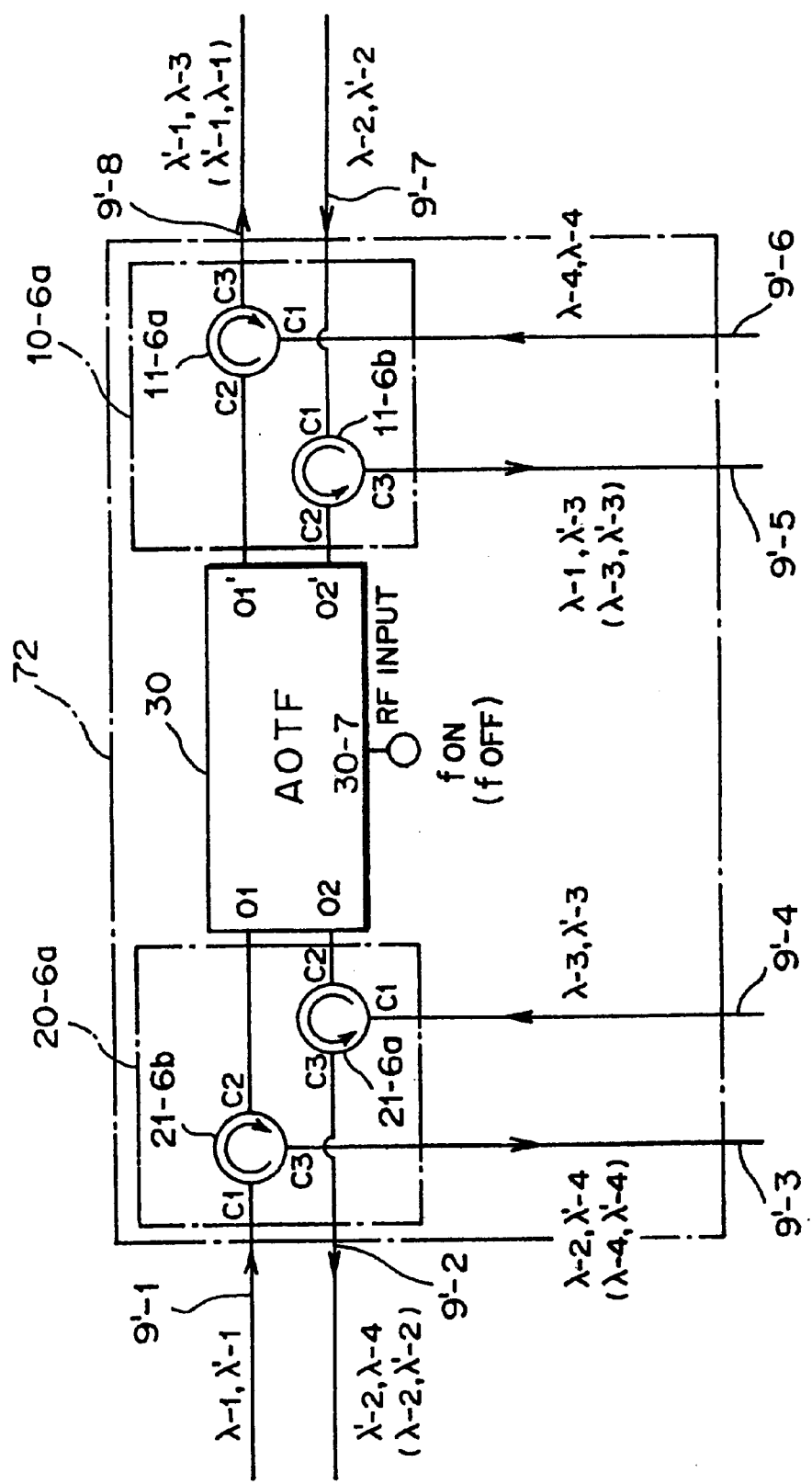
FIG. 19 is a block diagram illustrating an application of the bi-directional wavelength switching device shown in FIG. 17.
Figure 20:
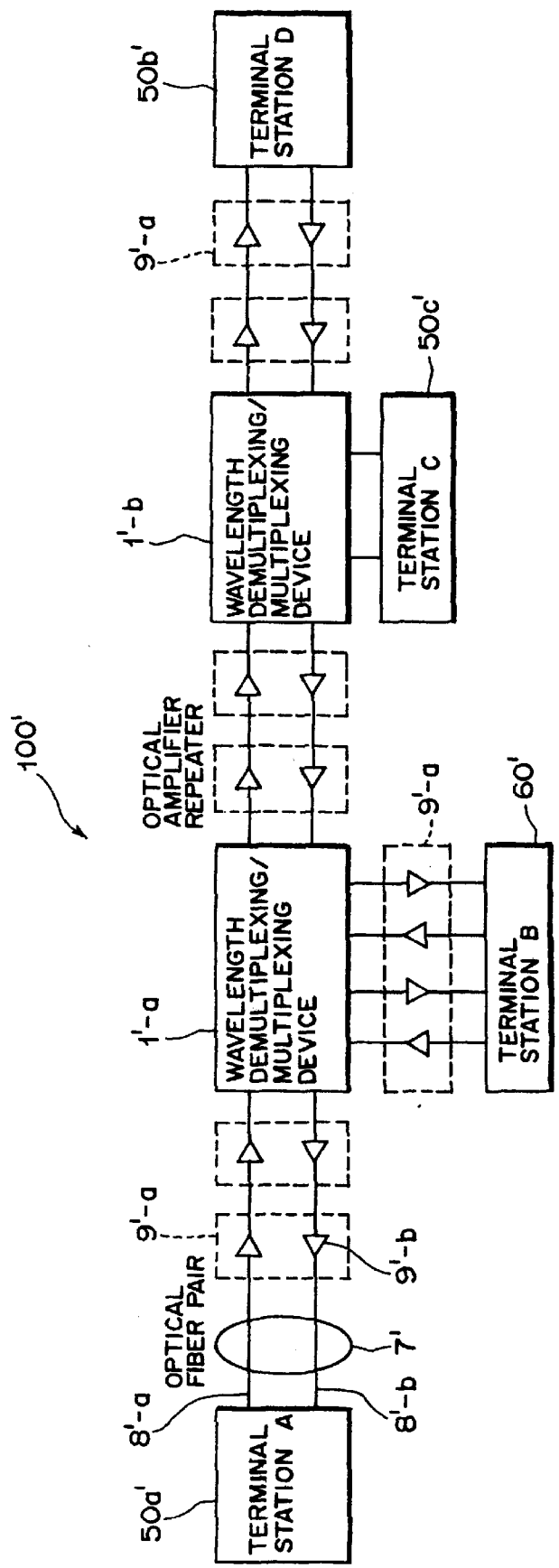
FIG. 20 is a block diagram illustrating a generally proposed wavelength division multiplexed transmission system.
Figure 21:
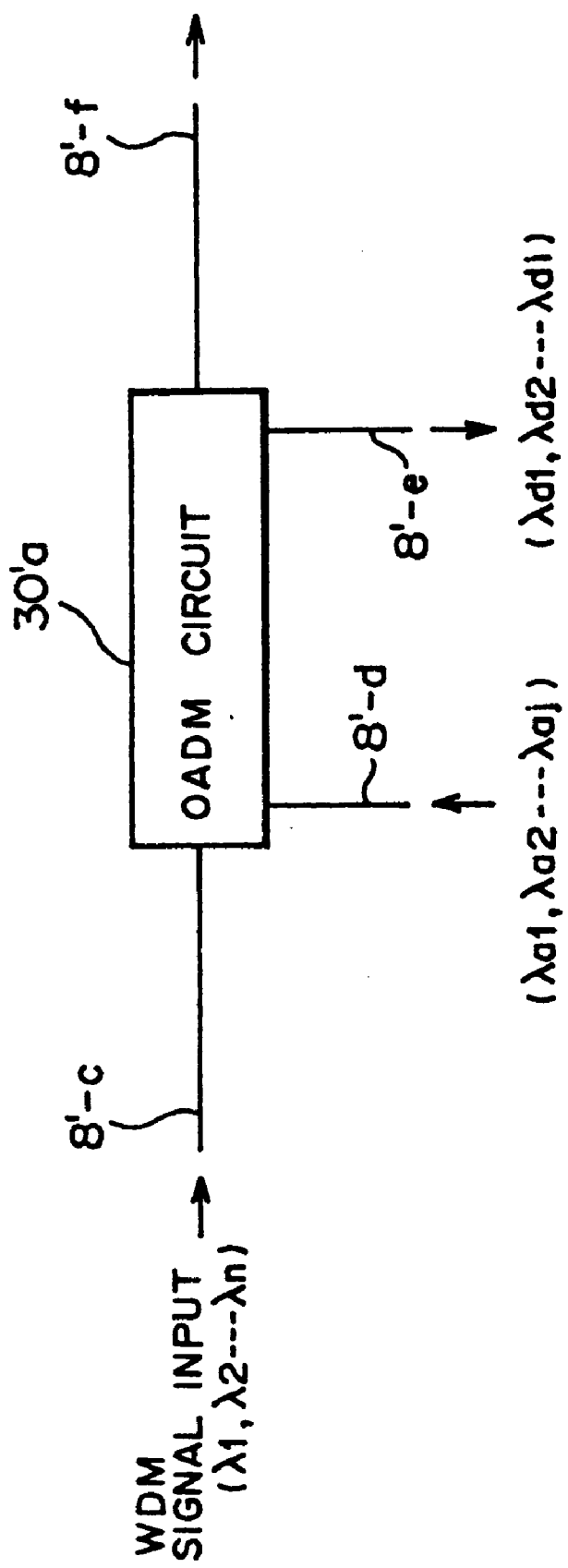
FIG. 21 is a block diagram illustrating an OADM circuit.
Figure 22:
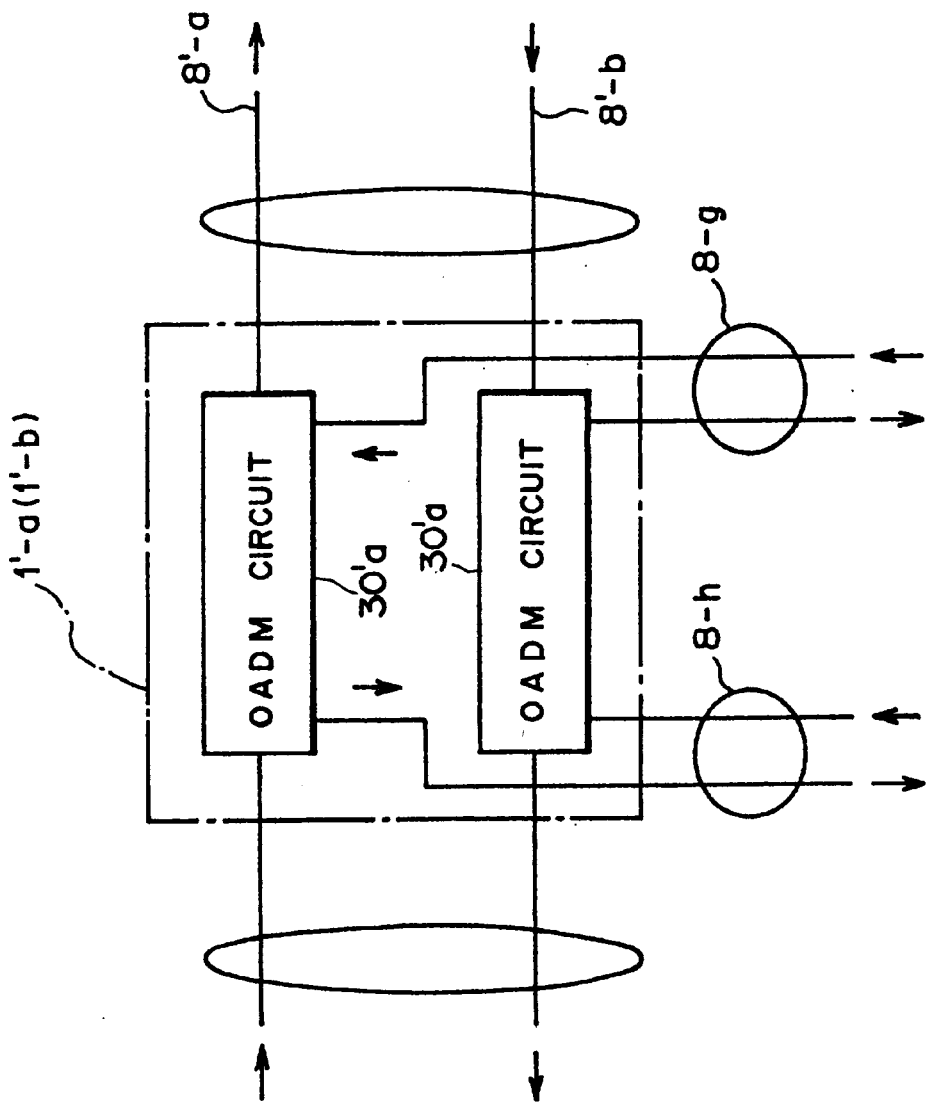
FIG. 22 is a block diagram illustrating a wavelength demultiplexing/multiplexing device employing OADM circuits.
Figure 23:
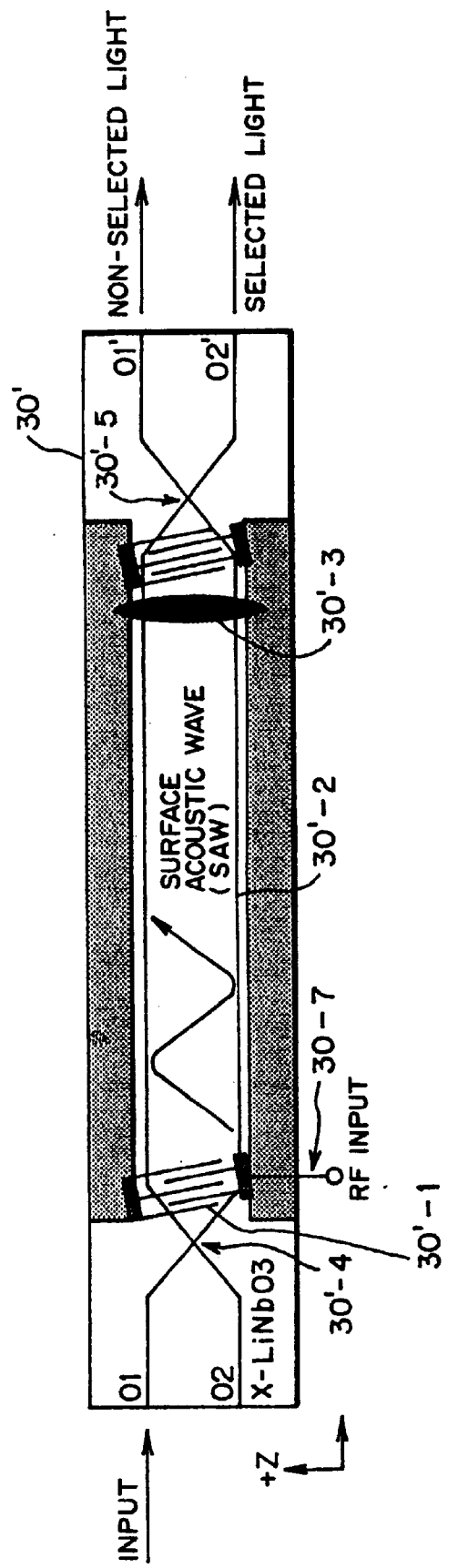
FIG. 23 is a top view of an AOTF.

FIG. 19 is a block diagram to illustrate a bi-directional wavelength switching device 72 relating to an applied example of the sixth embodiment of the invention. The bi-directional wavelength switching device 72 shown in FIG. 19 is provided with a first switching unit 10-6 a and a second switching unit 20-6a, each of which has two optical circulators, and this is different from the foregoing bi-directional wavelength switching device 71. The first switching unit 10-6 a and the second switching unit 20-6 a switch optical signals between the AOTF 30, and optical fibers 9'-1, 9'-2, 9'-3, 9'-4, 9'-5, 9'-6, 9'-7, 9'-8. Further, the optical fibers 9'-1 and 9'-2, or the optical fibers 9'-3 and 9'-4, etc., can be constructed by using an optical fiber pair.

(g) Others

The foregoing embodiments have focused mainly on an AOTF as the optical device. However, a device having the same function as an AOTF 30 can be used as the device to switch the input/output lines of an optical signal, wherein such device has two pairs of terminals and so that when a plurality of optical signals having different wavelengths are input from one terminal a first terminal pair, some optical signals are output from one terminal forming a second terminal pair, and the rest of the optical signals are output from the other terminal forming the second terminal pair.

Further, even though the optical circulators have been described as having three terminals, optical circulators can have four or more terminals, and the lines of the optical signals can be switched in the same manner as mentioned above.

While the invention has been described in connection with the preferred embodiments and examples, it will be understood that modifications within the principle outlined above will be evident to those skilled in the art without departing from the spirit and scope of the invention. Thus, the invention is not limited to the preferred embodiments and examples, but is intended to encompass such modifications.

What is claimed is:

1. A wavelength division multiplexed transmission system comprising:
    a pair of transmit/receive terminal stations communicating to each other;
    a multiplexing device provided within a communication line between the pair of optical transmit/receive terminal stations, comprising:
        an acousto-optic tunable filter having first and second sides;
        a pair of bi-directional optical transmission lines connected respectively to the first and second sides of the acousto-optic tunable filter; and
        a pair of optical switching units each connecting one of the bi-directional optical transmission lines to two single direction optical transmission lines such that for each optical switching unit, an optical signal travelling from the acousto-optic tunable filter is output to one of the single direction optical transmission lines and an optical signal travelling to the acousto-optic tunable filter is input from the other of the single direction optical transmission lines.

2. A wavelength division multiplexed transmission system according to claim 1, wherein each switching unit includes an optical circulator.

3. A wavelength division multiplexed transmission system according to claim 2, wherein
    the pair of transmit/receive terminal stations communicate to each other through bi-directional optical transmission lines linked respectively to the first and second sides of the acousto-optic tunable filter, and
    the device further comprises a terminal station linked to the single direction optical lines such that optical signals travelling from the acousto-optic tunable filter serve as dropped signals and optical signals travelling to the acousto-optic tunable filter serve as added signals.

4. A wavelength division multiplexed transmission system according to claim 1, wherein the pair of transmit/receive terminal stations communicate to each other through the single direction optical transmission lines such that each transmit/receive terminal station is linked to one side of the acousto-optic tunable filter.

5. A wavelength division multiplexed transmission system according to claim 4, wherein the multiplexing device further comprises:
- a second pair of bi-directional optical transmission lines connected respectively to the first and second sides of the acousto-optic tunable filter; and
- a second pair of optical switching units each connecting one of the second pair of bi-directional optical transmission lines to two single direction optical transmission lines, and
- the transmission system further comprises a terminal station linked to the second pair of bi-directional optical transmission lines through the second pair of optical switching units and single direction optical transmission lines.

6. A wavelength division multiplexed transmission system according to claim 4, wherein each switching unit includes an optical circulator.

* * * * *